United States Patent
Landman

(10) Patent No.: US 11,809,860 B2
(45) Date of Patent: *Nov. 7, 2023

(54) INDEXER OPERATION AND GENERATION OF INDEX DATA

(71) Applicant: JFrog Ltd., Netanya (IL)

(72) Inventor: Yoav Landman, Netanya (IL)

(73) Assignee: JFrog Ltd., Netanya (IL)

( * ) Notice: Subject to any disclaimer, the term of this patent is extended or adjusted under 35 U.S.C. 154(b) by 146 days.

This patent is subject to a terminal disclaimer.

(21) Appl. No.: 17/334,224

(22) Filed: May 28, 2021

(65) Prior Publication Data
US 2021/0286618 A1 Sep. 16, 2021

Related U.S. Application Data

(63) Continuation of application No. 16/931,510, filed on Jul. 17, 2020, now Pat. No. 11,023,228.

(Continued)

(51) Int. Cl.
*G06F 8/71* (2018.01)
*G06F 16/23* (2019.01)
(Continued)

(52) U.S. Cl.
CPC .............. *G06F 8/71* (2013.01); *G06F 9/54* (2013.01); *G06F 16/22* (2019.01); *G06F 16/2365* (2019.01)

(58) Field of Classification Search
CPC ........ G06F 8/71; G06F 16/22; G06F 16/2365; G06F 9/54

(Continued)

(56) References Cited

U.S. PATENT DOCUMENTS

2014/0244818 A1 8/2014 Taine et al.
2014/0310262 A1* 10/2014 Feinberg ................ G06F 16/22
707/812

(Continued)

OTHER PUBLICATIONS

JFrog. "8 Reasons for DevOps to Use a Binary Repository Manager on the Cloud," www.jfrog.com Oct. 2018 [retrieved on Sep. 28, 2020]. Retrieved from the Internet: <URL: https://media.jfrog.com/wp-content/uploads/2018/10/20131552/8-Reasons-for-DevOps-on-the-Cloud.pdf> pp. 1-15.

(Continued)

*Primary Examiner* — Chuck O Kendall
(74) *Attorney, Agent, or Firm* — Norton Rose Fulbright US LLP

(57) ABSTRACT

The present disclosure provides a method, system, and computer-readable storage media for operating a repository supporting multiple package types. To illustrate, the repository may be operated in accordance with an index framework that is used to maintain internal structures and interdependencies of each of the multiple package types. In a particular implementation, a REST API module may receive a REST request corresponding to a package type. In response to receiving the REST request, the REST API may initiate an index operation to generate index indicia based on the package type and a content of a portion of at least one memory corresponding to the package type. Based on the index indicia, an index model module may generate a packet type index and store, at a repository module, the package type index at a location in the at least one memory corresponding to the package type.

20 Claims, 11 Drawing Sheets

Related U.S. Application Data

(60) Provisional application No. 62/876,553, filed on Jul. 19, 2019.

(51) Int. Cl.
*G06F 16/22* (2019.01)
*G06F 9/54* (2006.01)

(58) Field of Classification Search
USPC .......................................................... 717/122
See application file for complete search history.

(56) References Cited

U.S. PATENT DOCUMENTS

| | | |
|---|---|---|
| 2015/0052099 A1 | 2/2015 | Chan et al. |
| 2016/0078136 A1 | 3/2016 | Nijjer |
| 2016/0217176 A1* | 7/2016 | Haviv ................. G06F 16/2228 |
| 2016/0267153 A1 | 9/2016 | Witkop et al. |
| 2017/0039218 A1 | 2/2017 | Prahlad et al. |
| 2018/0357333 A1* | 12/2018 | Isherwood ............ G06F 16/901 |
| 2020/0264862 A1 | 8/2020 | Bartolotta et al. |
| 2021/0019143 A1* | 1/2021 | Landman .................. G06F 9/54 |

OTHER PUBLICATIONS

Patent Cooperation Treaty, International Search Report and Written Opinion issued for PCT Application No. PCT/IB2020/056768, dated Nov. 24, 2020, 14 pages.

* cited by examiner

INDEXER OPERATION AND GENERATION OF INDEX DATA

CROSS-REFERENCE TO RELATED APPLICATIONS

The present application is a continuation of U.S. patent application Ser. No. 16/931,510, filed Jul. 17, 2020, that issued as U.S. Pat. No. 11,023,228 on Jun. 1, 2021, and entitled "INDEXER OPERATION AND GENERATION OF INDEX DATA"; which claims the benefit of U.S. Provisional Application No. 62/876,553 filed Jul. 19, 2019, and entitled "INDEXER OPERATION AND GENERATION OF INDEX DATA", the contents of which are incorporated by reference herein in their entirety.

TECHNICAL FIELD

The present application is generally related to the technical field of a repository supporting multiple package types, and more particularly, but not by way of limitation, to techniques for providing an index framework for a repository, generating index data for the repository, and/or providing a multi package extendable system for supporting multiple package types.

BACKGROUND

Computer systems and software have become an integral part of modern society and affect a variety of aspects of daily life. Software can be developed as a monolith, such as one piece of software, or as a service-oriented architecture where each piece of software provides a specific service and multiple pieces of software operate together. Additionally, software can be updated to add or remove functionality, to correct bugs (e.g., critical/functional issues), and/or to address security issues. Developing and updating software can occur at multiple locations (e.g., different local development environments) around the globe, with each location needing access to the same files/software. When an organization has development teams across the world, external and internal dependencies of files and/or software can be maintained locally at different locations/nodes to promote development productivity.

Software development can utilize multiple package types, such as Docker, Go, Maven, etc., each of which is composed of one or more corresponding artifacts (e.g., binaries). Due to interdependencies between artifacts of a particular package type, software that includes a small number of artifacts (e.g., 4 artifacts) could easily end up with a graph of artifacts that includes over a hundred artifacts that need to be acquired to run/execute the software. Accordingly, to manage the impact of the interdependencies of artifacts, development of software typically utilizes a repository of stored artifacts, such as a universal repository manager, that supports multiple protocols (e.g., packaging formats), build tools, and continuous integration (CI) servers.

Supporting multiple package types, build tools and CI servers provides multiple challenges. To illustrate, a given package type typically has a defined standard as to how data is to be structured and/or consumed, metadata is to be generated and/or updated, and application programming interfaces (APIs) are to be provided to publish and consume artifacts (e.g., binaries). Additionally, interdependencies, tools, command lines, and/or libraries necessary to implement a package type are not always apparent when using the package type. Further, package types are typically unique (i.e., two package types are not structured the same way), thereby making implementation of a repository for management of multiple package types difficult and complex.

BRIEF SUMMARY

Embodiments of the present disclosure provide systems, methods, and computer-readable storage media that provide for operating a repository supporting one or more package types. For example, the present disclosure describes an index framework to support the repository. The index framework may be used to maintain internal structures and interdependencies for each of the one or more package types and/or to generate index data for the repository. Additionally, or alternatively, the index framework provides a multi package extendable system for supporting multiple package types such that additional package types can be added to the system according to the index framework. In some implementations, a system (e.g., an artifact repository) stores a representation of one or more package type modules, where each package type module is structured according to the index framework and corresponds to a different package type. To illustrate, a package type module is configured to provide an abstraction of internal structures and interdependencies of the package type. For example, a first package type module may correspond to Docker and a second package type module may correspond to Maven. Each package type module includes a REST API module, an index model module, and a repository module. The REST API module is configured to receive a request, identify a package type of the request, and/or to route the request the repository module. The repository module is configured to process the one or requests and to perform operations on a portion of at least one memory corresponding to the package type. Additionally, the REST API module may initiate an index operation (e.g., an index job) to generate an index indicia. The index indicia is provided to the index model module for processing to generate and/or update an index object.

Thus, the systems, methods, and computer-readable storage media described herein enable implementation of a repository for management of one or more package types based on the index framework. Each package type may advantageously be represented by a corresponding package type module that includes an index model for the package type. The index model enables the package type module to maintain consistency of a portion of the at least one memory corresponding to the package type and enables system/repository metadata to be added to artifacts for the package type. The system/repository metadata, in addition to package type-specific metadata, may enable additional functionality (e.g., searches) not contemplated or required by a standard for a given package type. Additionally, the index framework provides a common framework for creating a new package type module to be efficiently added to the repository. Accordingly, the systems, methods, and computer-readable storage media described herein provide a common framework to be applied to multiple package types for integration of each package type into the repository in a structured and organized manner.

According to one embodiment, a system for operating a repository supporting multiple package types is described. The system includes at least one memory storing a representation of one or more package modules. The one or more package modules include a representational state transfer (REST) application programming interface (API) module, an index model module, and a repository module. The system also includes one or more processors coupled to the at least one memory. The one or more processors are configured to receive, at the REST API module, a REST request corresponding to the package type. The one or more processors are configured to, in response to receiving the REST request, initiate, at the REST API module, an index operation to generate an index indicia. The index indicia is based on the package type and content of a portion of the at least one memory corresponding to the package type. The one or more processors are configured to, based on the index indicia, at the index model module, generate a package type index. The one or more processors are further configured to store, at the repository module, the package type index at a location in the at least one memory corresponding to the package type.

According to yet another embodiment, a method for operating a repository supporting multiple package types is described. The method includes receiving, by one or more processors, a representational state transfer (REST) request corresponding to a package type. The method includes, in response to receiving the REST request, initiating, by the one or more processors, an index operation to generate an index indicia. The index indicia is based on the package type and content of a portion of at least one memory corresponding to the package type. The method also includes generating, by the one or more processors, a package type index based on the index indicia. The method further includes storing, by the one or more processors, the package type index at a location in the at least one memory corresponding to the package type.

According to another embodiment, a computer program product is described that includes a computer-readable storage device, such as a non-transitory computer-readable storage medium, that includes instructions that, when executed by one or more processors, cause the one or more processors to perform operations for operating a repository supporting multiple package types. The operations include executing a first routine to receive a representational state transfer (REST) request corresponding to a package type. The operations include executing a second routine to, in response to receiving the REST request, initiate an index operation to generate an index indicia. The index indicia is based on the package type and contents of a portion of at least one memory correspond to the package type. The operation also include executing a third routine to generate a package type index based on the index indicia and executing a fourth routine to store the package type index at a location in the at least one memory corresponding to the package type.

The foregoing has outlined rather broadly the features and technical advantages of the present disclosure in order that the detailed description of the invention that follows may be better understood. Additional features and advantages will be described hereinafter which form the subject of the claims of the present disclosure. It should be appreciated by those skilled in the art that the conception and specific implementations disclosed may be readily utilized as a basis for modifying or designing other structures for carrying out the same purposes of the present disclosure. It should also be realized by those skilled in the art that such equivalent constructions do not depart from the scope of the present disclosure as set forth in the appended claims. The novel features which are believed to be characteristic of the embodiments, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure, reference is now made to the following descriptions taken in conjunction with the accompanying figures, in which.

DETAILED DESCRIPTION

Figure 1:
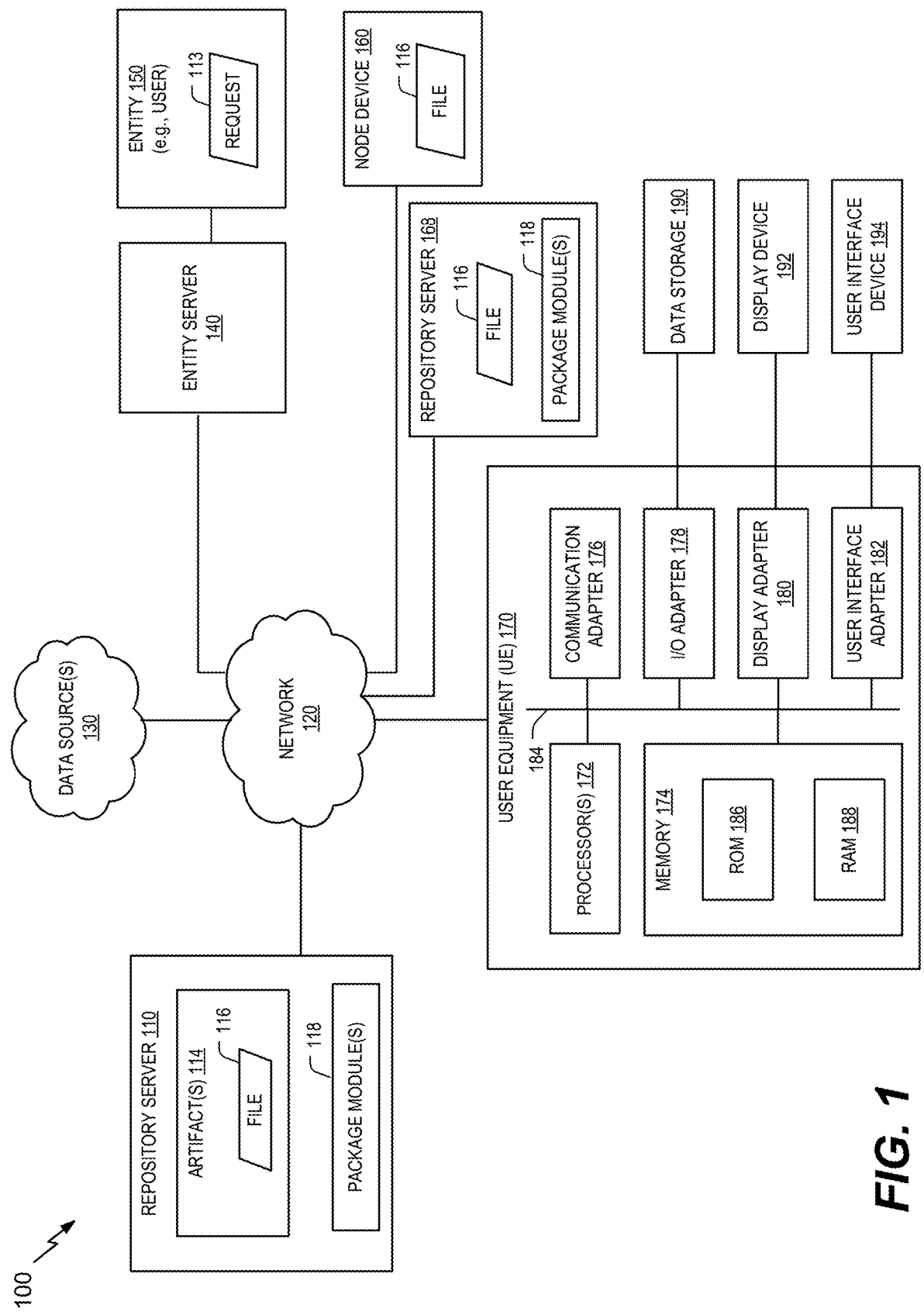
FIG. 1 is a block diagram of an example of a system that includes a server for supporting multiple package types.

Inventive concepts utilize a system to provide a repository supporting one or more package types. The one or more package types may include a package type selected from the group consisting of Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and/or VCS, as illustrative, non-limiting examples. For each of the one or more package types supported by the repository, the system may store a corresponding package type module, where each package type module is structured according to a common index framework and is configured to maintain internal structures and interdependencies for the corresponding package types and/or to generate index data for the repository. To illustrate, a package type module may include a representational state transfer (REST) application programming interface (API) module, a repository module, and an index model module. The REST API module is configured to receive a request, identify a package type of the request, and/or to route the request the repository module and to initiate an index operation (e.g., an index job) to generate an index indicia. The repository module is configured to process the one or requests and to perform operations on a portion of at least one memory corresponding to the package type. The index indicia is provided to the index model module for processing, such as for processing the index indicia to generate and/or update an index object, initiate an update of artifact metadata, initiate generation and/or update of system/repository metadata, or any combination thereof. In some implementations, the system also includes an indexer (e.g., an indexer module) that include a queue and/or execution logic. The queue may be configured to receive and store one or more index indicia. The execution logic may be configured to access a particular index model and to process, based on the particular index model, the one or more index indicia to generate index data, such as an index object to be stored at the memory. Accordingly, the indexer is configured to perform operations corresponding to each package type module of the system. Thus, the systems, methods, and computer-readable storage media described herein provide a common framework to be applied to multiple package types for integration of each package type into the repository in a structured and organized manner.

In some embodiments, the REST API module is configured to receive a request, such as a user request, corresponding to a particular package type. For example, the request may include or correspond to a HyperText Transfer Protocol (HTTP) request that is received via a tool or plug-in corresponding to the system (e.g., the repository). In response to receiving the request, the REST API module may identify an operation (e.g., upload, delete, modify, search, deploy, create metadata folder, generate/update metadata properties, etc.) based on the request and generate a repository request based on the operation. The REST API module may provide the repository request to the repository module such that the repository module performs the operation. Additionally, or alternatively, in response to receiving the request, the system may initiate, at the REST API module, an index operation to generate an index indicia. The index indicia is based on the package type and content of a portion of the at least one memory corresponding to the package type. In some implementations, generation and/or execution of the repository request and generation and/or execution of the index operation may occur in parallel. In some such implementations, execution of the repository request may be completed prior to execution of the index operation and/or prior to generation of index data based on the index operation. Accordingly, for each package type module, a corresponding REST API module is configured to receive a request and initiate one or more operations at a corresponding repository module and/or at a corresponding index module.

Embodiments also provide that the repository module further includes a storage module, a metadata module, and a search module. In some implementations, each module of the repository module is a different API configured to perform corresponding operations on the at least one memory. To illustrate, the storage module may be configured to perform operations to deploy or delete an artifact. The metadata module may be configured to generate, store, and/or update metadata for an artifact to be deployed. The search module may be configured to perform one or searches of stored metadata, such as package type-specific metadata and/or system repository metadata. Accordingly, for each package type, a corresponding repository module is configured to perform one or more operations (corresponding to a received request) on at least one memory.

Embodiments also provide that the index model module for a particular package type includes an index model for the particular package type. For example, the index model may include a set of one or more rules to maintain consistency (according to a standard for the particular package type) of a portion of the at least one memory (of the repository) corresponding to the package type. To illustrate, the index model (e.g., the one or more rules) are applied by the index model module to generate and/or update a package type index, such as an index object, based on one or more index indicia. Additionally, or alternatively, the index model (e.g., the one or more rules) are applied by the index model module to generate and/or update metadata, such as package type-specific metadata—e.g., metadata according to a standard for the particular package type. The one or more index indicia may be stored at or accessible to the index model module. For example, the index model module may include or be coupled to a queue configured to store one or more index indicia for processing by the index model module Storing the one or more index indicia in the queue may enable a group of index indicia to be batch processed. In some implementations, the index model module provides the package type index to the repository module for storage at a location in the at least one memory corresponding to the package type. Accordingly, for each package type module, a corresponding index model module is configured to perform one or more operations to maintain consistency (according to a standard for the particular package type) and/or to generate index data for the repository.

Additionally, in some implementations, the index model (e.g., the one or more rules) are applied by the index model module to generate and/or update system/repository metadata. The system/repository metadata may be distinct from the package type-specific metadata to support a standard/ operation of a package type. For example, the system/ repository metadata may indicate a checksum, a user, a build job, a release date, or other information. In some implementations, the system/repository metadata and the package type-specific metadata are included in the same data vector for an artifact. The system/repository metadata may enable the system to provide additional functionality (e.g., searches) not contemplated or required by a standard for a given package type.

In some embodiments, as an illustrative, non-limiting example, the system receives a request to store a new version of an artifact. For example, the request may be received at the REST API module which identifies a package type corresponding to the request. The REST API module interacts with the repository module to store an object (e.g., the new version of the artifact) at a portion of at least one memory. To illustrate, the REST API may interact with the storage API of the repository module to upload the new version of the artifact. In addition to storing the new version of the artifact, indexing capabilities may be added for the new version of the artifact. Adding the indexing capabilities may be more computationally complex and/or time consuming as compared to one or more operations to store the new version of the artifact. Accordingly, in response to receiving the request, the REST API module may initiate an index operation to generate an index indicia. The index indicia is based on the package type and content of a portion of the at least one memory corresponding to the package type. The index model module may process the index indicia, based on the index model for the package type, and generate, based on the index indicia, a package type index (e.g., an index object). In some implementations, the index object may be stored as part of metadata for the new version of the artifact.

Additionally, or alternatively, processing the index indicia may include initiating a scan operation to identify one or more stored objects, such a prior version of the artifact. For example, when a new version of an artifact is stored, a metadata update may be generated to change the status of a previous version of the artifact to no longer be a latest version.

Thus, the systems, methods, and computer-readable storage media described herein enable a repository for management of one or more package types based on a common index framework. For example, each package type may advantageously be represented by a corresponding package type module that includes a REST API module, a repository module, and an index module for the package type. The index model enables the package type module to maintain consistency of a portion of the at least one memory corresponding to the package type and enables system/repository metadata to be added to artifacts for the package type. The system/repository metadata, in addition to package type-specific metadata, may enable additional functionality (e.g., searches) not contemplated or required by a standard for a given package type. Additionally, the index framework provides a common framework for creating a new package type module to be efficiently added to the repository. Accordingly, the systems, methods, and computer-readable storage media described herein provide a common framework to be applied to multiple package types for integration of each package type into the repository in a structured and organized manner.

Certain units described in this specification have been labeled as modules in order to more particularly emphasize their implementation independence. A module is "[a] self-contained hardware or software component that interacts with a larger system." Alan Freedman, "The Computer Glossary" 268 (8th ed. 1998). A module may include a machine- or machines-executable instructions. For example, a module may be implemented as a hardware circuit including custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also include software-defined units or instructions, that when executed by a processing machine or device, transform data stored on a data storage device from a first state to a second state. An identified module of executable code may, for instance, include one or more physical or logical blocks of computer instructions that may be organized as an object, procedure, or function. Nevertheless, the executables of an identified module need not be physically located together, but may include disparate instructions stored in different locations that, when joined logically together, include the module, and when executed by the processor, achieve the stated data transformation. A module of executable code may be a single instruction, or many instructions, and may even be distributed over several different code segments, among different programs, and/or across several memory devices. Similarly, operational data may be identified and illustrated herein within modules, and may be embodied in any suitable form and organized within any suitable type of data structure. The operational data may be collected as a single data set, or may be distributed over different locations including over different storage devices.

In the following description, numerous specific details are provided, such as examples of programming, software modules, user selections, network transactions, database queries, database structures, hardware modules, hardware circuits, hardware chips, etc., to provide a thorough understanding of the present embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the disclosure.

As used herein, various terminology is for the purpose of describing particular implementations only and is not intended to be limiting of implementations. For example, as used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). The term "coupled" is defined as connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the term "substantially" may be substituted with "within [a percentage] of" what is specified, where the percentage includes 0.1, 1, or 5 percent; and the term "approximately" may be substituted with "within 10 percent of" what is specified. The phrase "and/or" means and or or. To illustrate, A, B, and/or C includes: A alone, B alone, C alone, a combination of A and B, a combination of A and C, a combination of B and C, or a combination of A, B, and C. In other words, "and/or" operates as an inclusive or. Similarly, the phrase "A, B, C, or a combination thereof" or "A, B, C, or any combination thereof" includes: A alone, B alone, C alone, a combination of A and B, a combination of A and C, a combination of B and C, or a combination of A, B, and C.

The terms "comprise" (and any form of comprise, such as "comprises" and "comprising"), "have" (and any form of have, such as "has" and "having"), and "include" (and any form of include, such as "includes" and "including"). As a result, an apparatus that "comprises," "has," or "includes" one or more elements possesses those one or more elements, but is not limited to possessing only those one or more elements. Likewise, a method that "comprises," "has," or "includes" one or more steps possesses those one or more steps, but is not limited to possessing only those one or more steps.

Any embodiment of any of the systems, methods, and article of manufacture can consist of or consist essentially of—rather than comprise/have/include—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb. Additionally, the term "wherein" may be used interchangeably with "where."

Further, a device or system that is configured in a certain way is configured in at least that way, but it can also be configured in other ways than those specifically described. The feature or features of one embodiment may be applied to other embodiments, even though not described or illustrated, unless expressly prohibited by this disclosure or the nature of the embodiments.

Referring to FIG. 1, a block diagram of a system that includes a server supporting multiple package types is shown and designated 100. System 100 includes a server 110 (e.g., a first repository server), a network 120, data sources 130, an entity server 140, an entity 150, a node device 160, a server 168 (e.g., a second repository server), and user equipment 170.

Server 110 may include one or more servers that, according to one implementation, are configured to perform several of the functions and/or operations described herein. One or more of the servers including server 110 may include memory, storage hardware, software residing thereon, and one or more processors configured to perform functions associated with system 100, as described further herein at least with reference to FIGS. 2 and 3. One of skill in the art will readily recognize that different server and computer architectures can be utilized to implement server 110, and that server 110 is not limited to a particular architecture so long as the hardware implementing server 110 supports the functions of the repository system disclosed herein. As shown in FIG. 1, user equipment can be used to enable an owner and/or administrator of repository server 110 to access and modify aspects (e.g., instructions, applications, data) of repository server 110. For example, components including user equipment 170, such as one or more processors 172, can be used to interface with and/or implement the server 110. Accordingly, user equipment 170 (e.g., a user station) may serve as a repository portal by which a user may access a repository system, such as a universal artifact repository, disclosed herein. For example, an artifact repository system may include server 110 (e.g., a first server) and server 168 (e.g., a second server). The portal can function to allow multiple users, inside and outside system 100 (e.g., at multiple instances of user equipment 170), to interface with one another. Additionally, it is noted that the one or more components described with reference to user equipment 170 may also be included in one or more of repository server 110, entity server 140, entity 150, node device 160, and/or server 168.

As shown, server 110 includes one or more artifacts 114 and one or more package modules 118 (also referred to herein as one or more package type modules). Artifacts may include one or more binaries (e.g., a computer file that is not a text file). For example, the one or more artifacts 114 may include a file, such as a representative file 116. The artifacts may correspond to one or more package types. Illustrative, non-limiting examples of package types include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. In some implementations, a first artifact may correspond to a first package type, such as Maven, and a second artifact may correspond to a second package type, such as Bower. Server 110 may include a package module (of one or more package modules 118) for each package type supported by server 110. One or more package modules 118 may be configured to provide an abstraction of internal structures and interdependencies of the corresponding package type, such as structures and interdependencies that are based on a standard for the package type. Each package module may be structured according to a common framework to enable server 110 to perform indexing operations. To illustrate, each package module may include a representational state transfer (REST) application programming interface (API) module, an index model module, and a repository module, as further described herein with reference to FIG. 3.

Network 120, such as a communication network, may facilitate communication of data between server 110 and other components, servers/processors, and/or devices. For example, network 120 may also facilitate communication of data between server 110 and one or more data sources 130, entity server 140, a node device 160, server 168, or any combination therefore. Network 120 may include a wired network, a wireless network, or a combination thereof. For example, network 120 may include any type of communications network, such as a direct PC-to-PC connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate.

Data sources 130 include the sources from which server 110 collects information. For example, data sources may include one or more reciprocities of artifacts, such as open source artifacts, vulnerability data, and/or license data, as illustrative, non-limiting examples.

Entity server 140 may include one or more servers which entity 150 uses to support its operations. Entity 150 may include any individual, organization, company, corporation, department (e.g., government), or group of individuals. For example, one entity may be a corporation with retail locations spread across multiple geographic regions (e.g., counties, states, or countries). As another example, another entity may be a corporation with cruise ships. As another example, another entity may be a group of one or more individuals. In a particular implementation, entity 150 includes a business and at least one user who can access server 110. For example, the user may access server 110 via an application, such as an application hosted by server 110. To illustrate, the user may have an account (e.g., on behalf of entity 150) and may log in to server 110 via the application. Although system 100 shows one entity 150, in other implementations, system 100 includes multiple entities. In a particular implementation, the multiple entities may include a first entity and a second entity, as described further herein at least with reference to FIG. 2. In such implementations, the first entity and the second entity may be the same entity (e.g., part of the same company) or may be different entities.

In some implementations, entity 150 is configured to add, modify, and/or access one or more artifacts (e.g., 114) at server 110. For example, entity 150 may generate a request 113 that is sent to server 110. Request 113 may correspond to a particular package type supported by server 110 and may indicate an operation (e.g., upload, delete, modify, search, deploy, create metadata folder, generate/update metadata properties, etc.) to be performed by server 110. In some implementations, request 113 may include or correspond to a HyperText Transfer Protocol (HTTP) request that is provided to server 110 via a tool or plug-in corresponding to server 110. Receipt and processing of one or more requests (e.g., 113) by server 110 is described further herein at least with reference to FIG. 3. In some implementations, entity 150 provides a query (e.g., 113) and/or one or more parameters for a query which is performed by server 110. To illustrate, entity 150 initiates a query by server 110 to identify one or more files (e.g., one or more artifacts) corresponding to a particular build job identifier. In other implementations, entity 150 sends request 113 to identify a most recent version of an artifact.

Node device 160 includes one or more files, such as file 116. In some implementations, node device 160 may include or correspond to entity 150. Although system 100 is shown as having one node device 160, in other implementations, the system 100 may include multiple node devices (e.g., 160). Node device 160 may include a data center, a point-of-sale, a mobile device, or an Internet of things (IoT) device. In some implementations, node device 160 includes a communications device, a fixed location data unit, a mobile location data unit, a mobile phone, a cellular phone, a satellite phone, a computer, a tablet, a portable computer, a display device, a media player, or a desktop computer. Alternatively, or additionally, node device 160 may include a set top box, an entertainment unit, a navigation device, a personal digital assistant (PDA), a monitor, a computer monitor, a television, a tuner, a radio, a satellite radio, a music player, a digital music player, a portable music player, a video player, a digital video player, a digital video disc (DVD) player, a portable digital video player, a satellite, a vehicle or a device integrated within a vehicle, any other device that includes a processor or that stores or retrieves data or computer instructions, or a combination thereof. In other illustrative, non-limiting examples, the system, the device, or the apparatus may include remote units, such as hand-held personal communication systems (PCS) units, portable data units such as global positioning system (GPS) enabled devices, meter reading equipment, or any other device that includes a processor or that stores or retrieves data or computer instructions, or any combination thereof.

Server 168 may be a repository server and may include or correspond to server 110. In some implementations, server 110 and server 168 may be included in a universal artifact management system. Server 110 and server 168 may execute different environments while sharing artifacts 114 (e.g., files 116).

With respect to user equipment 170, user equipment may include one or more processors 172, memory 174, a communication adapter 176, an input/output adapter 178, a display adapter 180, a user interface adapter 182, and a bus 184. As shown, each of one or more processors 172, such as a central processing unit (CPU), memory 174, communication adapter 176, input/output adapter 178, display adapter 180, and user interface adapter 182 are coupled to/via bus 184. As noted above, one or more components of user equipment 170 may also be included in one or more other devices, such as server 110, to enable and/or support operations and functionality at the other device.

One or more processors 172 may include a CPU or microprocessor, a graphics processing unit ("GPU"), and/or microcontroller that has been programmed to perform the functions of user equipment 170. Implementations described herein are not restricted by the architecture of the one or more processors 172 so long as the one or more processors 172, whether directly or indirectly, support the operations described herein. The one or more processors 172 may be one component or multiple components that may execute the various described logical instructions.

Memory 174 includes read only memory (ROM) 186 and random access memory (RAM) 188. ROM 186 may store configuration information for booting user equipment 170. ROM 186 can include programmable read-only memory (PROM), erasable programmable read-only memory (EPROM), electrically erasable programmable read-only memory (EEPROM), optical storage, or the like. User equipment 170 may utilize RAM 188 to store the various data structures used by a software application. RAM 188 can include synchronous RAM (SRAM), dynamic RAM (DRAM), synchronous dynamic RAM (SDRAM), or the like. ROM 186 and RAM 188 hold user and system data, and both ROM 186 and RAM 188 may be randomly accessed. In some implementations, memory 174 may store the instructions that, when executed by one or more processor 172, cause the one or more processors 172 to perform operations according to aspects of the present disclosure, as described herein.

Communications adapter 176 can be adapted to couple user equipment 170 to a network, which can be one or more of a LAN, WAN, and/or the Internet. Therefore, in some embodiments, server 110 may be accessed via an online portal. The I/O adapter 178 may couple user equipment 170 to one or more data storage devices 190, such as one or more of a hard drive, a solid state storage device, a flash drive, a compact disc (CD) drive, a floppy disk drive, a tape drive, and/or the like. Also, data storage devices 190 can be a separate server coupled to user equipment 170 through a network connection to I/O adapter 178. Display adapter 180 can be driven by one or more processors 172 to control presentation via display device 192. In some implementations, display adapter 180 may display a graphical user interface (GUI) associated with a software or web-based application on display device 192, such as a monitor or touch screen. User interface adapter 182 couples user interface device 194, such as a keyboard, a pointing device, and/or a touch screen to the user equipment 170. The I/O adapter 178 and/or the user interface adapter 182 may, in certain embodiments, enable a user to interact with user equipment 170. Any of devices 172-184 may be physical and/or logical.

The concepts described herein are not limited to the architecture of user equipment 170. Rather, user equipment 170 is provided as an example of one type of computing device that can be adapted to perform the functions of server 110 and/or a user interface device. For example, any suitable processor-based device can be utilized including, without limitation, personal data assistants (PDAs), tablet computers, smartphones, computer game consoles, multi-processor servers, and the like. Moreover, the systems and methods of the present disclosure can be implemented on application specific integrated circuits (ASIC), very large scale integrated (VLSI) circuits, or other circuitry. In fact, persons of ordinary skill in the art may utilize any number of suitable structures capable of executing logical operations according to the described embodiments. Additionally, it should be appreciated that user equipment 170, or certain components thereof, may reside at, or be installed in, different locations within system 100.

In some implementations, server 110 (and/or server 168) can include a server and/or cloud-based computing platform configured to perform operations and/or execute the steps described herein. Accordingly, server 110 (and/or server 168) may include a particular purpose computing system designed, configured, or adapted to perform and/or initiate operations, functions, processes, and/or methods described herein and can be communicatively coupled with a number of end user devices (e.g., user equipment 170), which can be, e.g., a computer, tablet, Smartphone, or other similar end user computing device. Users can interact with server 110 (and/or server 168) using a device via one or more networks, such as network 120, which itself can include one or more of a local intranet, a LAN (Local Area Network), a WAN (Wide Area Network), a virtual private network (VPN), and the like. As will be apparent to those of skill in the art, communicative coupling between different devices of system 100 can be provided by, e.g., one or more of wireless connections, a synchronous optical network (SONET) connection, a digital T1, TN, E1 or E3 line, Digital Data Service (DDS) connection, DSL (Digital Subscriber Line) connection, an Ethernet connection, and the like.

Figure 2:
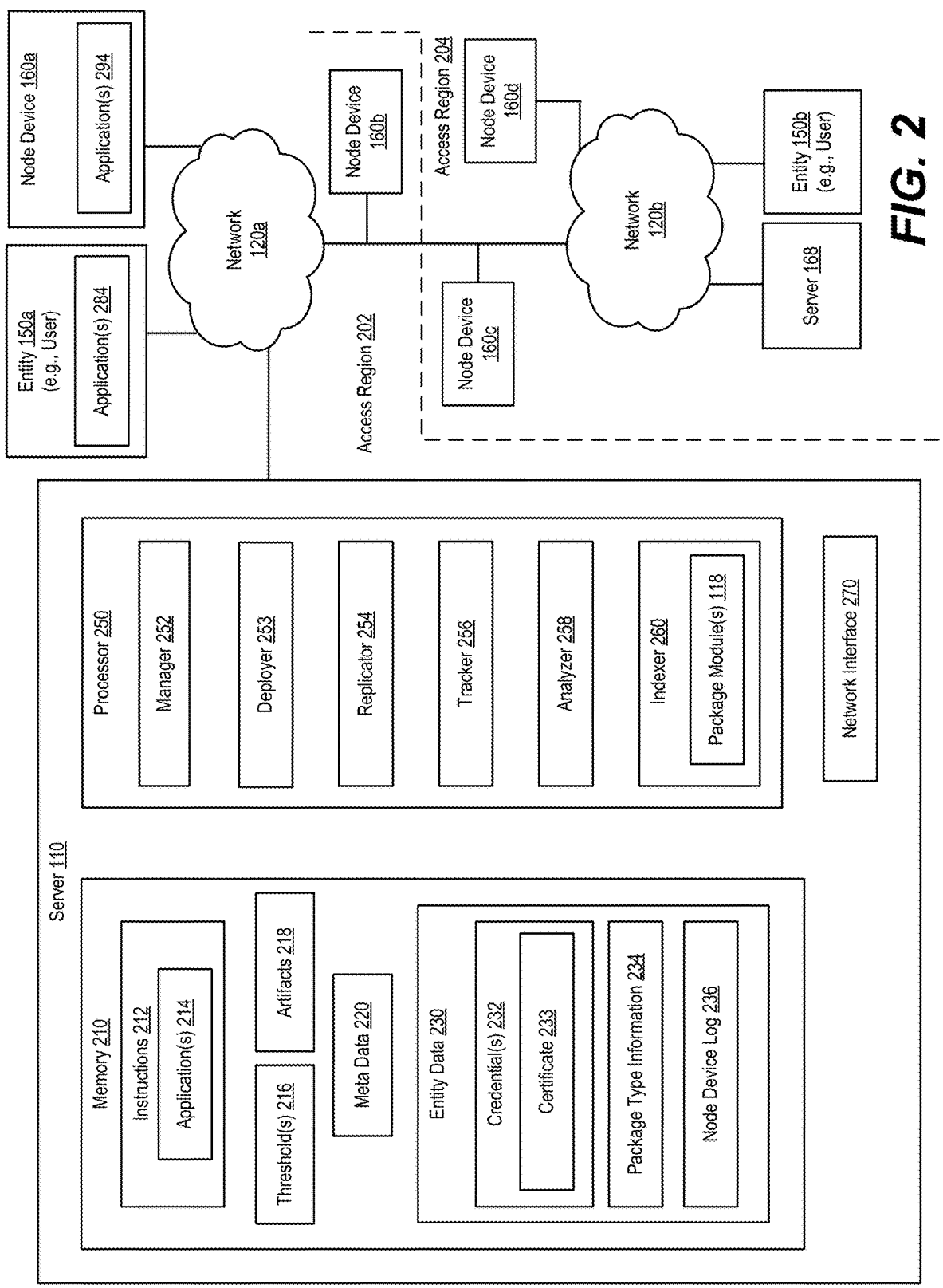
FIG. 2 is a block diagram of another example of a system for supporting multiple package types.

Referring to FIG. 2, a block diagram of a system for supporting multiple package types according to an embodiment is shown as a system 200. System 200 may include or correspond to at least a portion of system 100. System 200 includes server 110, networks 120a, 120b, entities 150a, 150b, node devices 160a, 160b, 160c, 160d, and server 168. As shown in FIG. 2, system 200 is spread across multiple regions, such as a first region 202 and a second region 204. For example, each region may correspond to a different city, county, state, country, continent, or other physical or logical distinction. To illustrate, first region 202 may include or correspond to North America (e.g., the United States) and second region 204 may include or correspond to Asia (e.g., Japan).

As shown, server 110 is included in first region 202 and server 168 is included in second region 204. Server 168 may be a repository server and may include or correspond to server 110. In some implementations, server 110 and server 168 may be included in a universal artifact management system. Networks 120a, 120b may include or correspond to network 120. Each of the entities 150a, 150b may include or correspond to entity 150. In some implementations, a first entity 150a and a second entity 150b may be part of the same group, company, etc., or may be part of different groups, companies, etc. Each of node devices 160a, 160b, 160c, 160d may include or correspond to node device 160. In some implementations, each of node devices 160a, 160b, 160c, 160d corresponds to the same entity. In other implementations, at least one node device of node devices 160a, 160b, 160c, 160d corresponds to another entity.

Server 110 may include a memory 210 (e.g., one or more memory devices), one or more processors 250, and a network interface 270. Network interface 270 may be configured to be communicatively coupled, via one or more networks (e.g., 120a, 120b) to one or more external devices, such as one or more of entities (e.g., 150a, 150b), one or more node devices (e.g., 160a, 160b, 160c, 160d), one or more servers (e.g., 168), one or more data sources (e.g., 130), or any combination thereof. For example, network interface 270 may include a transmitter, a receiver, or a combination thereof (e.g., a transceiver).

Memory 210 may include ROM devices, RAM devices, one or more HDDs, flash memory devices, SSDs, other devices configured to store data in a persistent or non-persistent state, or a combination of different memory devices. Memory 210 includes (e.g., is configured to store) instructions 212, thresholds 216, artifacts 218 (e.g., binaries), meta data 220, and entity data 230. For example, memory 210 may store instructions 212, that when executed by the one or more processors 250, cause the processor(s) 250 to perform functions, methods, processes, operations as described further herein. In some implementations, instructions 212 may include or be arranged as an application 214 (e.g., a software program) associated with a universal artifact repository. For example, application 214 may provide a portal via which one or more entities and/or users interact with and access server 110. Application 284 at entity 150a and application 294 at node device 160a are configured to enable entity 150a and node device 160a to communicate with and/or access server 110. In some implementations, each of application 284 and application 294 enable functionality as described with respect to server 110. In other implementations, application 284 and application 294 may enable and/or support less than all of the functionality as described with reference to server 110. To illustrate, application 294 may not provide functionality as described with reference to analyzer 258.

In some implementations, memory 210 includes multiple memories accessible by processor 250. In some such implementations, one or more of the memories may be external to server 110. To illustrate, at least one memory may include or correspond to a database accessible to server 110, such as a database that stores one or more thresholds 216, artifacts 218, meta data 220, entity data 230, or any combination thereof. In some implementations, memory 210 may include or be coupled to cloud storage such that one or more thresholds 216, one or more of artifacts 218, meta data 220, and/or entity data 230 is stored at a cloud storage location and accessible by server 110.

Threshold(s) 216 may include or correspond to one or more thresholds, such as a time period threshold, a size threshold (e.g., a number of entries in a queue), etc. Artifacts 218 may include or correspond to artifacts 114. Meta data 220 may include meta data for artifacts 114, meta data for application 214, meta data for one or more files (e.g., 116), or any combination thereof. Meta data for an artifact (e.g., a file 116) may include a file name, a file size, a checksum of the file, and/or one or more properties that annotate the artifact, such as when the artifact was created by a build, a build job name, an identifier of who initiated the build, a time the build was initiated, a build agent, a CI server, a build job number, and/or a quality assurance test passed indicator, as illustrative, non-limiting examples. In some implementations, meta data for an artifact may include package type meta data (based on a standard for the package type) and repository meta data to provide functionality (independent of the standard for the package type) supported by server 110.

Entity data 230 may include data associated with one or more entities. For example, entity data 230 may include or correspond to one or more of entity 150a, 150b. Entity data 230 may include one or more credentials 232, package type information 234, and a node device log 236. Credential 232 may include login information to enable one or more users and/or one or more entities to access server 110. Additionally, or alternatively, credential 232 may include security or authentication information, such as certificate 233. Certificate 233 may include security or authentication information, such as a private key and/or public key or a token of a user and/or entity. Package type information 234 may identify one or more package types used by the corresponding entity. As illustrative, non-limiting examples, the one or more package types may include Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Node device log 236 includes node device information of one or more node devices corresponding to an entity of entity data 230. To illustrate, node device log 236 may include topology information (e.g., location information) of one or more node devices, one or more node device identifiers, owner/manager information, file and/or software information (e.g., name, version number, size, etc.) installed at one or more node devices, or any combination thereof, as illustrative, non-limiting examples. In some implementations, node device log 236 may indicate a list of target nodes at which one or more security objects are to be synchronized.

Processor 250 may include may be a CPU (e.g., processor 172) or microprocessor, a graphics processing unit ("GPU"), a field-programmable gate array (FPGA) device, an application-specific integrated circuits (ASIC), another hardware device, a firmware device, a microcontroller, or any combination thereof that has been programmed to perform the functions. As shown in FIG. 2, in an implementation, server 110 (e.g., processor 250) may include a manager 252, a deployer 253, a replicator 254, a tracker 256, an analyzer 258, and an indexer 260. In some implementations, processor 250 may include one or more modules. For example, each of manager 252, deployer 253, replicator 254, tracker 256, analyzer 258, and indexer 260 may include or correspond to one or more modules. In an implementation, server 110 (e.g., processor 250 or modules 252, 253, 254, 256, 258, 260) may be configured to execute one or more routines that perform various operations as described further herein. A module is "[a] self-contained hardware or software component that interacts with a larger system." Alan Freedman, "The Computer Glossary" 268 (8th ed. 1998). A module may include a machine- or machines-executable instructions. A module may also be implemented in programmable hardware devices such as field programmable gate arrays, programmable array logic, programmable logic devices or the like. Modules may also include software-defined units or instructions, that when executed by a processing machine or device, transform data stored on a data storage device from a first state to a second state. Modules may be separate or two or more may be combined.

In some implementations, one or more of modules (e.g., 252, 253, 254, 256, 258, 260) may locally reside in memory 210 or in a separate location. Further, as will be understood by those of skill in the art, a "module" can include an application-specific integrated circuit ("ASIC"), an electronic circuit, a processor (shared, dedicated, or group) that executes one or more of software or firmware, a combinational logic circuit, and/or other suitable components that provide the described functionality.

Referring to processor 250, manager 252 may be configured to enable a user (e.g., 150a) to manage one or more other components/modules (e.g., 253, 254, 256, 258, 260) of processor 250. Additionally, or alternatively, manager 252 may enable storage of and/or access to one or artifacts 218. In some implementations, manager 252 may enable administration of multiple instances of a user account, such as a first instance at server 110 and a second instance at server 168. Accordingly, manager 252 may be configured to operate as an administrative tool that enables an entity (e.g., 150a) to monitor and control a first instance of a user account (corresponding to first region 202) and a second instance of the user account (corresponding to second region 204). For example, the entity (e.g., 150a) may be able to see which services (e.g., 253, 254, 256, 258, 260) are operating in different regions, add/modify/remove individual users in different regions, set different permissions for individual users in different regions, provide and store one or more public keys, etc. In some implementations, manager 252 includes a manager module that includes one or more routines, executable by one or more processors (e.g., the processor 172 of FIG. 1) or processor 250 to enable a user (e.g., 150a) to manage one or more other components/modules (e.g., 253, 254, 256, 258, 260) of processor 250, as described herein.

Deployer 253 may be configured to perform a software release distribution. For example, deployer 253 provides a secure and structured platform to distribute release binaries as a single coherent release bundle to multiple remote locations and update them as new release versions are produced. A release bundle may include one or more files and/or release bundle information which includes or indicates a list of the one or more files (e.g., artifacts) to be included in the release bundle and meta data (e.g., properties) associated with the release bundle. The release bundle information may include, for each file of the bundle release, a checksum (of the file), meta data (corresponding to the file), or both. In some implementations, the release bundle also includes additional meta data (e.g., file name, file size, path to the file, etc.) corresponding to the release bundle, such as a release bundle name, a version number, a source identifier, description information, release date, a size. Additionally, or alternatively, the release bundle information may include a signature (or other cryptography technique) to render the release bundle information immutable.

Deployer 253 may enable generation of a release bundle, auditing and traceability by tracking all changes associated with a release bundle distribution of the release bundle including permission levels release content, scheduling of a release bundle for distribution, tracking of a release bundle, stopping distribution of a release bundle, and/or selection of target destinations. Additionally, or alternatively, a software release may be provisioned amongst one or more nodes devices (e.g., 160a, 160b, 160c, 160d). In some implementations, as part of the release flow, release bundles are verified by the source and/or destination to ensure that they are signed correctly and safe to use. In some implementations, deployer 253 includes a deployer module that includes one or more routines, executable by one or more processors (e.g., the processor 172 of FIG. 1) or processor 250 to perform a software release distribution.

Replicator 254 may be configured to coordinate and provide one or more artifacts (e.g., one or more files) and/or meta data between two or more devices. For example, replicator 254 may coordinate transfer of one or more artifacts (e.g., one or more files) and/or meta data between server 110 and server 168, between server 110 and one or more of node devices 160a, 160b, 160c, 160d, or both. In some implementations, replicator 254 is configured to be used in conjunction with deployer 253 to distribute a software release, provide efficient network utilization by optimizing replication, and reduce network load and/or release bundle synchronization time from source device (e.g., server 110) to target instance (e.g., server 168) or node device (e.g., 160a, 160b, 160c, 160d). Additionally, or alternatively, replicator 254 may be configured to identify a difference between at least one file stored at a first device (e.g., server 110) and one or more files stored at a second device (e.g., server 168 or a node device), and initiate transfer of at least one or more portions of a file to the second device. In some implementations, replicator 254 includes a replicator module that includes one or more routines, executable by one or more processors (e.g., the processor 172 of FIG. 1) or processor 250 to coordinate and provide one or more artifacts (e.g., one or more files) and/or meta data between two or more devices.

Tracker 256 may be configured to track one or more artifacts, meta data, one or more release bundles, or any combination thereof deployed or attempted to be deployed to a node device, such as one or more of node devices 160a, 160b, 160c, 160d, a server (e.g., 110, 168), or both. In some implementations, tracker 256 includes a tracker module that includes one or more routines, executable by one or more processors (e.g., the processor 172 of FIG. 1) or processor 250 to track one or more artifacts, meta data, one or more release bundles, or any combination thereof deployed or attempted to be deployed to a node device, such as one or more of node devices 160*a*, 160*b*, 160*c*, 160*d* and/or one or more servers.

Analyzer 258 may be configured to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact). In some implementations, analyzer 258 is configured to analyze data stored at memory 210, identify issues related to deployed software, perform recursive scanning, and perform an impact analysis. In some implementations, analyzer 258 includes an analyzer module that includes one or more routines, executable by one or more processors (e.g., the processor 172 of FIG. 1) or processor 250 to analyze one or more artifacts (e.g., 218) and/or meta data (e.g., 222) to identify a vulnerability corresponding to the one or more artifacts, determine license compliance of the one or more artifacts, and/or determine an impact of an issue with a deployed file (e.g., artifact).

Indexer 260 may be configured to provide an indexing capability, including maintaining interdependencies and information, for one or more package types. Additionally, or alternatively, indexer 260 is configured to generate meta data (e.g., 220), such as meta data defined by a universal artifact repository manager and utilized by one or more of manager 252, deployer 253, replicator 254, tracker 256, and analyzer 258. Additionally, or alternatively, indexer 260 include one or more package modules 118, as further described herein with reference to FIGS. 3 and 4. In some implementations, indexer 260 includes an indexer module that includes one or more routines, executable by one or more processors (e.g., the processor 172 of FIG. 1) or processor 250 to provide an indexing capability, including maintaining interdependencies and information, for one or more package types.

Figure 3:
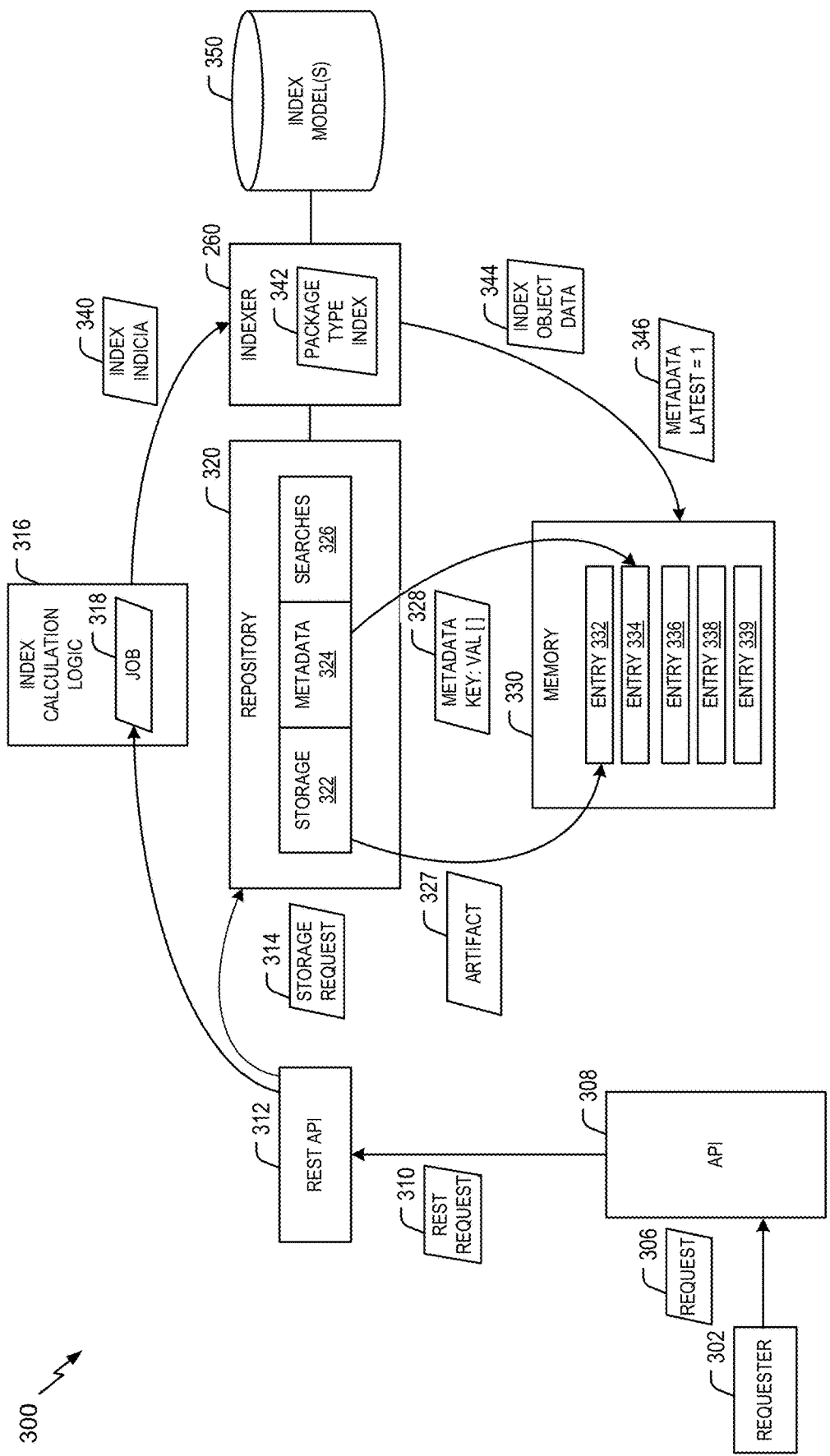
FIG. 3 is a block diagram of another example of a system for supporting multiple package types.

Referring to FIG. 3, a block diagram of a system for supporting multiple packet types is shown and designated 300. System 300 may include or correspond to at least a portion of system 100 and/or system 200. System 300 includes a requester 302, an API 308, a REST API 310, index calculation logic 316, a repository 320, a memory 330, indexer 260, and index models 350. In a particular implementation, components 308, 312, 316, 320, 330, 260, and 350 are included in or accessible to server 110 or server 168. In some implementations, system 300 includes one or more package type modules, such as a particular package type module that includes REST API 310, repository 320, index model(s) 350, and/or indexer 260.

Memory 330 may include one or more memory devices. For example, memory 330 may include or correspond to memory 210. In some implementations, memory 330 may correspond to a particular package type of one or more package types. In other implementations, memory may correspond to multiple package types. In some such implementations, memory 330 may be partitioned into multiple portions that each correspond to a different package type, as described further herein with reference to FIG. 4. As shown, memory 330 includes multiple entries, such a first entry 332, a second entry 334, a third entry 336, a fourth entry 338, and a fifth entry 339. Although described as including five entries, in other implementations, memory 330 may include fewer or more than 5 entries.

As shown in FIG. 3, in an implementation, server 110 (e.g., processor 250) may include API 308, REST API 312, repository 320, and/or indexer 260. In some implementations, processor 250 may include one or more modules. For example, each of API 308, REST API 312, repository 320, and indexer 260 may include or correspond to one or more modules. In an implementation, server 110 (e.g., processor 250 or modules 260, 308, 312, 320) may be configured to execute one or more routines that perform various operations as described further herein. In some implementations, one or more of modules (e.g., 260, 308, 312, 320) may locally reside in memory 330 or in a separate location.

Requester 302 (e.g., a first access device) is configured to generate a request 306. Request 306 may include or correspond to entity 150. In some implementations, a second requester (e.g., a second access device) may also be configured to generate requests. To illustrate, multiple requesters may correspond to the same entity (e.g., 150) and may be configured to generate requests (e.g., 306) that re provided to server 110 via API 308. In some implementations, requester 302 may include a tool, such as a build server or an online tool, that is available to user.

API 308 is configured to receive request 306 and to generate a REST request 310. For example, API 308 may be included in server 110, such as processor 250 and/or manager 252. API 308 is configured to send REST request 310 to REST API 312. In some implementations, API 208 is configured to identify a package type corresponding to request 306 and to route REST request 310 to a particular REST API of multiple package type modules. In some implementations, API 308 includes an API module that includes one or more routines, executable by one or more processors (e.g., the processor 172 of FIG. 1) or processor 250 to perform a request processing operation described herein.

REST API 312 is configured to receive REST request 310 and to identify a package type of REST request 310. For example, REST API 312 may confirm that REST request 310 and REST API 312 correspond to the same package type. After identifying the package type associated with REST request 310, REST API 312 is configured to initiate an index operation. For example, REST API 312 may initiate a job 318 at index calculation logic 316. REST API 312 is also configured to generate, based on REST request 310, and send an instruction/request to repository 320. To illustrate, REST API 312 may generate and send an instruction/request for repository 320 to perform an operation such as upload, delete, modify, search, deploy, create metadata folder, generate/update metadata properties, etc. For example, as shown, REST API 312 may send a storage request 314 to repository 320. Although REST API 312 is described as being separate from API 308, in other implementations, REST API 312 and API 308 may be included in a single API that receives request 306, identifies a package type of request 306, and performs one or more operations as described with reference to REST API 312. In some implementations, REST API 312 includes a REST API module that includes one or more routines, executable by one or more processors (e.g., the processor 172 of FIG. 1) or processor 250 to process REST request 310 as described herein.

Index calculation logic 316 is configured to perform job 318 to generate index indicia 340. For example, index calculation logic 316 may perform an index job (e.g., job 318) by performing an index calculation to generate index indicia 340. Index indicia 340 may include or correspond to an index value that corresponds to an operation performed by repository 320. To illustrate, when storage request 314 corresponds to a storage operation to store a new version of an artifact 327 at memory 330, index calculation logic 316 may perform job 318 to generate an index value to be assigned to (e.g., for) the new version of artifact 327. As another example, when storage request 314 corresponds to a storage operation to store metadata, such as a metadata key 328 including a vector of one or more values, index calculation logic 316 may perform job 318 to generate an index value to be assigned to (e.g., for) the new version. As another example, when REST request 310 corresponds to an update to metadata stored at memory 330 and/or a search operation, index indicia 340 may correspond to an index value corresponding to the metadata and/or one or more index values corresponding to a result of the search operation. Although described as being separate from indexer 260, in other implementations, index calculation logic 316 may be included in indexer 260. In some implementations, index calculation logic 316 includes an index calculation logic module that includes one or more routines, executable by one or more processors (e.g., the processor 172 of FIG. 1) or processor 250 to perform index calculation operations described herein.

Repository 320 is configured to process one or more requests and to perform operations on at least one memory corresponding to the package type. For example, repository 320 may be configured to process instructions/requests (e.g., storage request 314) and to perform operations at memory 330. In some implementations, repository 320 includes a repository module that includes one or more routines, executable by one or more processors (e.g., processor 172 of FIG. 1 or processor 250 of FIG. 2) to process storage requests and perform operations at memory 330 as described herein.

In a particular implementation, repository 320 includes storage module 322, metadata module 324, and searches module 326. In some implementations, each of the modules 322-326 include or correspond to APIs configured to perform corresponding operations on memory 330. For example, storage module 322 may include or correspond to a storage API, metadata module 324 may include or correspond to a metadata API, and searches module 326 may include or correspond to a searches API. Storage module 322 may be configured to perform operations to deploy or delete an artifact from memory 330. In some implementations, storage module 322 includes a storage module that includes one or more routines executable by one or more processors (e.g., processor 172 of FIG. 1 or processor 250 of FIG. 2) to deploy or delete an artifact. Metadata module 324 may be configured to generate, store, and/or update metadata for an artifact to be deployed. In some implementations, metadata module 324 includes a metadata module that includes one or more routines executable by one or more processors (e.g., processor 172 of FIG. 1 or processor 250 of FIG. 2) to generate, store, and/or update metadata. In some implementations, storage request 314 may correspond to artifact 327 and metadata 328 such that repository 320 stores artifact 327 and metadata 328 at memory 330 in the same entry or in different entries. In such a situation, storage module 322 may perform storage of artifact 327 and metadata 328, or storage module 322 may perform storage of artifact 327 and metadata module 324 may perform storage of metadata 328. Searches module 326 may be configured to perform one or more searches of stored metadata. In some implementations, searches module 326 includes a searches module that includes one or more routines executable by one or more processors (e.g., processor 172 of FIG. 1 or processor 250 of FIG. 2) to perform one or more searches of stored metadata.

Indexer 260 (e.g., an index model module) may be configured to process index indicia 340 and to generate a package type index 342 based on index indicia 340 and an index model, such as an index model 350, for the package type that is configured to maintain consistency of a portion of the memory 330 corresponding to the package type. In some implementations, indexer 260 may include a queue to store index indicia prior to processing, as further described with reference to FIG. 4. Indexer 260 may generate package type index 342 (e.g., package type index data) based on index indicia 340 and the model. Package type index 342 may include metadata, a metadata update, and/or an index object (e.g., an index value) for one or more entries of memory 330. For example, when a new version of an artifact (e.g., 327) is stored, a metadata update (e.g., 346) may be generated to change the status of a previous version of the artifact to no longer be a latest version. Additionally, or alternatively, when a version of an artifact (e.g., 327) is stored or deleted, one or more interdependencies between stored artifacts may need to be updated to reflect the storage/deletion. In such situations, indexer 260 generates package type index 342 that corresponds to entries to be updated with index object data 344 to reflect the storage/deletion. In some implementations, metadata corresponding to indexer 260 may include system/repository metadata that is distinct from package type-specific metadata to support a standard/operation of a package type. System/repository metadata may be stored at memory 330. In some implementations, the system/repository metadata may be stored with or as part of metadata 328. Operations initiated by indexer 260 to be performed on memory 330 may be performed by indexer 260 directly on memory 330. Additionally, or alternatively, one or more one or more operations initiated by indexer 260 to be performed on memory 330 may be provided to repository 320 as an instruction/request.

In some implementations, indexer 260 may receive index indicia 340, such as an index value corresponding to a new version of artifact 327 stored at entry 332. Index indicia 340 may be stored at a queue of indexer 260. Indexer 260 may retrieve index indicia 340 from the queue and may access a particular model (e.g., 350) that corresponds to the same package type as index indicia 340 (i.e., same package time as artifact 327). Indexer 260 may process index indicia 340 based on the particular model to generate package type index 342 (e.g., package type index data). Package type index 342 may take the form of one or more index values (e.g., index object data) and/or metadata. In some implementations, package type index 342 may further be generated based on scan data generated based on a scan operation performed on memory 330. For example, a scan operation may be performed on memory to identify a latest version of an artifact when a new version of the artifact has been saved. Additionally, or alternatively, the scan operation may identify one or more entries of memory 330 to be updated to reflect an index value (corresponding to index indicia 340) in order to maintain consistencies. In some implementations, indexer 260 may access in index file (e.g., an index object) stored at memory 300 that identifies interdependencies between different index values corresponding to a package type.

Index model(s) 350 include a set of rules for a particular package type to enable the package type module to maintain consistency of a portion of the at least one memory corresponding to the package type and enables system/repository metadata to be added to artifacts for the package type. Index model(s) 350 may be stored at a memory a memory and/or database that is accessible to indexer 260. In some implementations, index models 350 may be included in indexer 260.

During operation of system 300, API 308 receives request 306. For example, request 306 may include a HTTP request to perform an operation such as upload, delete, modify, search, deploy, create metadata folder, generate/update metadata properties, etc. API 308 identifies a package type corresponding to request 306. For example, the package type may be determined based on a format of request 306 and/or based on an indicator included in request 306. Based on identification of the package type, API 308 may route request 306 to REST API 312 as REST request 310. Alternatively, API 308 may generate REST request 310 based on request 306 and send REST request 310 to REST API.

REST API 312 receives REST request 310 and identifies one or more operations to be performed at memory 330 based on REST request 310. REST request 310 generates one or more instructions and/or one or more requests to perform the one or more operations. For example, when REST request 310 includes a request to store a new version of artifact 327 and corresponding metadata 328, REST API 312 may generate storage request 314 and send storage request 314 to repository 320. To illustrate, REST API 312 may send storage request 314 to storage 322 (e.g., storage API) and/or metadata 324 (e.g., metadata API).

Responsive to receiving the one or more instructions and/or the one or more requests from REST API 312, repository 320 may perform the corresponding one or more operations. To illustrate, responsive to receiving storage request 314, storage 322 may perform a write operation to store artifact 327 at first entry 332 of memory 330 and metadata 324 may perform a write operation to store metadata 328 at second entry 334 of memory 330.

In addition to generating the one or more instructions and/or the one or more requests, REST API 321 may generate one or more index jobs (e.g., 318) based on REST request 310. The one or more index jobs may be based on and/or correspond to the one or more operations to be performed at memory based on REST request 310. For example, when the one or more operations include storing a new artifact, the one or more jobs may correspond to generating a new index value and updating interdependencies. As another example, when the one or more operations include deleting an artifact, the one or more jobs may correspond to updating interdependencies. In some situations, such as when the one or more operations correspond to performing a search, REST API 312 may not initiate one or more jobs for index calculation logic as the search operation performed by searches 326 (e.g., search module) does not change or alter metadata and/or index values.

Index calculation logic 316 receives the one or more jobs (e.g., 318) and processes the one or more jobs to generate index indicia 340. Index indicia 340 is provided to indexer 260 for further processing based on an index model. In some implementations, index indicia 340 is provided to a queue of indexer 260. Indexer 260 may process the index indicia 340 based on the index model to generate package type index data (e.g., 342). In some implementations, the package type index data (e.g., 342) may be used to generate and/or update an index file corresponding to memory 330. Additionally, or alternatively, the package type index data (e.g., 342) may include or correspond to one or more index values and/or metadata to be generated and/or update to maintain consistency according to the index model. Indexer 260 may initiate one or more operations based on the package type index data (e.g., 342). For example, indexer may initiate a store and/or update operation on memory 330 to store index object data 344 (e.g., one or more index value) and/or to store metadata, such as meta data 346.

According to an implementation, system 300 is configured to operate a repository (e.g., a an artifact repository) supporting multiple package types and includes at least one memory (e.g., 330) storing a representation of one or more package modules. The one or more package modules include a REST API module (e.g., 312), an index model module (e.g., 260), and a repository module (e.g., 320). The system also includes one or more processors (e.g., 250) coupled to the at least one memory. The one or more processors are configured to receive, at the REST API module, a REST request (e.g., 310) corresponding to a package type. The one or more processors are configured to, in response to receiving the REST request, initiate, at the REST API module, an index operation (e.g., 318) to generate index indicia (e.g., 340). The index indicia is based on the package type and content of a portion of the at least one memory corresponding to the package type. The one or more processors are also configured to, based on the index indicia, at the index model module, generate a package type index (e.g., 342). The one or more processors are further configured to store, at the repository module, the package type index at a location in the at least one memory corresponding to the package type.

According to another embodiment, a computer program product is described that includes a computer-readable storage device, such as a non-transitory computer-readable storage medium, that includes instructions that, when executed by one or more processors (e.g., 250), cause the one or more processors to perform operations for operating a repository supporting multiple package types. The operations include executing a first routine to receive a REST request (e.g., 310) corresponding to a package type. The operations include executing a second routine to, in response to receiving the REST request, initiate an index operation (e.g., 318) to generate an index indicia (e.g., 340). The index indicia is based on the package type and content of a portion of at least one memory (e.g., 330) corresponding to the package type. The operations include executing a third routine to generate a package type index (e.g., 342) based on the index indicia and executing a fourth routine to store the package type index at a location in the at least one memory corresponding to the package type.

In some such implementations, the package type includes a package type selected from the group consisting of Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS. Additionally, or alternatively, the REST request includes a REST API (e.g., 312) request. Additionally, or alternatively, the package type index is stored at the at least one memory to maintain consistency of the portion of the at least one memory corresponding to the package type.

Thus, the system 300 enables a new package type to be efficiently added to system 300 such that repository 320 supports wire protocols for the new package type. Additionally, indexer 260 for the package type is configured to enable the package module 118 to maintain consistency of a portion of memory 330 corresponding to the package type and enables system/repository metadata to be added to artifacts for the package type. The package type-specific metadata may enable additional functionality (e.g., searches) not contemplated or required by a protocol/standard for a given package type.

Thus, system 300 describes management of one or more package types based on a common index framework. For example, each package type may advantageously be represented by a corresponding package type module that includes a REST API module, a repository module, and an index module for the package type. The index model enables the package type module to maintain consistency of a portion of the at least one memory corresponding to the package type and enables system/repository metadata to be added to artifacts for the package type. System 300 may beneficially generate index information in accordance with an index framework that supports multiple package types. By using the index framework, a repository may be configured that maintains internal structures and interdependencies for each of multiple package types supported by the repository. Additionally, system 300 may support system/repository metadata, in addition to package type-specific metadata, to enable additional functionality (e.g., searches) not contemplated or required by a standard for a given package type.

Figure 4:
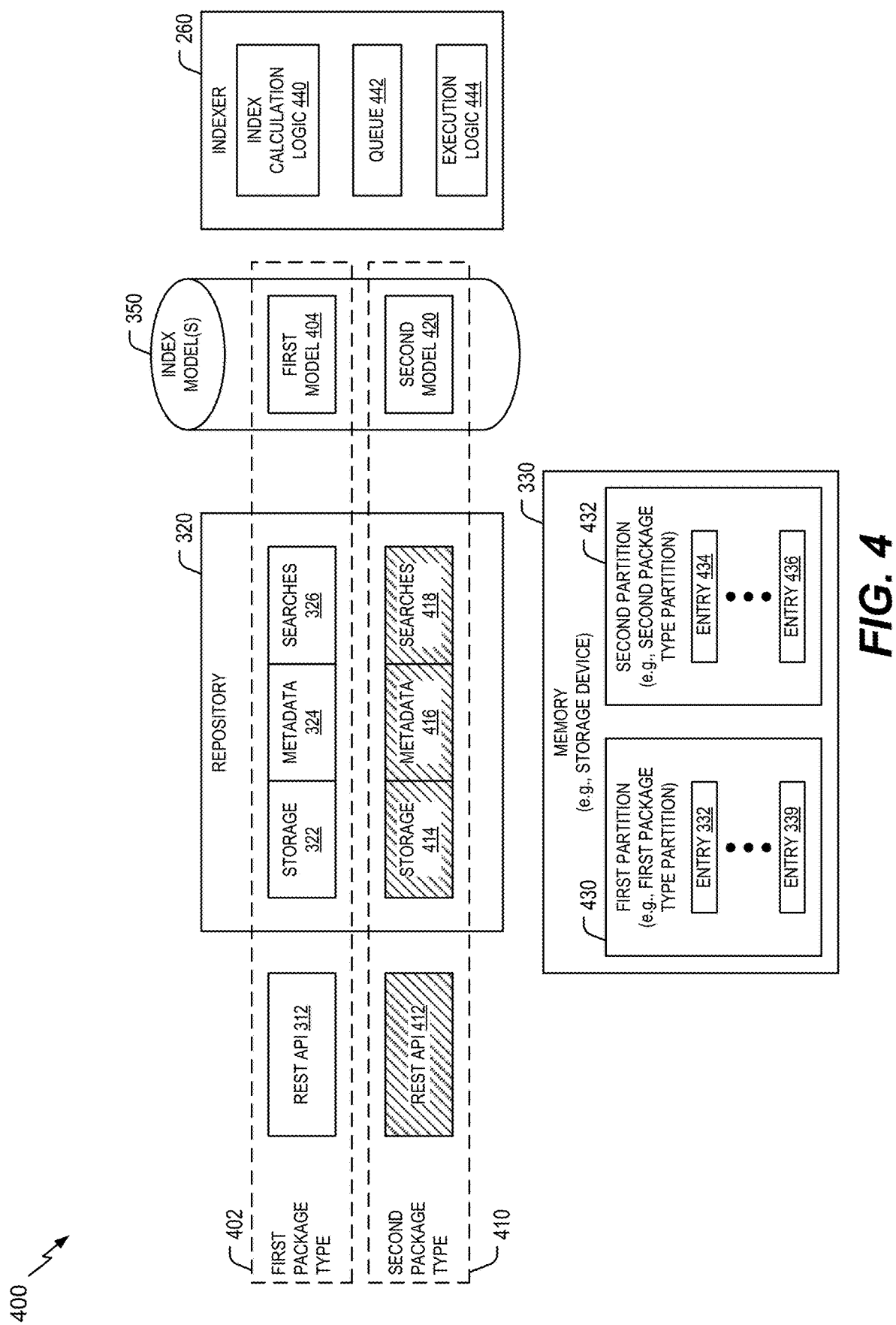
FIG. 4 is a block diagram of another example of a system for supporting multiple package types.

Referring to FIG. 4, a system for supporting multiple package types is shown and designated 400. System 400 shows multiple package type modules in the context of system 300 of FIG. 3. For example, system 400 includes repository 320, memory 330, indexer 260, and index models 350 of FIG. 3.

System 400 includes a first package type module 402. First package type module 402 corresponds to a first package type. First package type module 402 include REST API 312, storage API 322, metadata API 324, and searches API 326, as described with reference to FIG. 3. First package type module 402 also includes first model 404 (of index models 350). First model 404 indicates the internal structures and interdependencies that correspond to the first package type.

FIG. 4 also illustrates that another package type has been added to repository 320. For example, system 400 includes a second package type module 410. Second package type module 410 corresponds to a second package type that is different from the first package type. Second package type module 410 includes a REST API 412, a storage API 414, a metadata API 416, and a searches API 418. Components 412-418 are configured to operate similarly to components 312 and 322-326 except that they operate on requests associated with the second package type. Second package type module 410 also includes a second model 420 (of index models 350). Second model 420 indicates the internal structures and interdependencies that correspond to the second package type. Additional package type modules can be added by adding corresponding REST APIs, storage APIs, metadata APIs, searches APIs, and models to system 400.

In a particular implementation, system 400 includes a single indexer 260 (e.g., an indexer model module), and indexer 260 is configured to operate on requests corresponding to different package types. In other implementations, each package type module may include a corresponding indexer, such as a dedicated indexer.

In a particular implementation, indexer 260 includes index calculation logic 440, a queue 442, and execution logic 444. Indexer 260 may be configured to receive index indicia (e.g., 340) and generate a package type index (e.g., 342), as described with reference to FIG. 3. For example, index calculation logic 440 may include or correspond to index calculation logic 316 and may be configured to calculate index indicia. Queue 442 may be configured to receive and store the index indicia prior to processing. For example, queue 442 may store a plurality of index indicia, and the plurality of index indicia may be processed as a batch (e.g., using batch processing). Processing multiple index indicia as a batch may reduce the number of times that models of the index models 350 are accessed, as compared to processing each index indicia as it is received by the indexer 260, which may reduce overhead associated with generating package type indexes. Execution logic 444 is configured to generate package type index data (e.g., 342) and/or index object data (e.g., 344) based on processing of one or more index indicia and to cause the index object data to be stored at a particular location in the memory 330.

As illustrated in FIG. 4, memory 330 is partitioned according to package type. For example, memory 330 includes first partition 430 and second partition 432. First partition 430 corresponds to a first package type, and second partition 432 corresponds to a second package type. Each partition includes a plurality of entries associated with the respective package type. For example, first partition 430 includes entries 332-339 corresponding to the first package type, and second partition 432 includes entries 434-436 corresponding to the second package type.

During operation, REST API 312 receives a REST request corresponding to the first package type. The REST request may be to add an artifact, to delete an artifact, to update metadata, etc. Additionally, REST API 412 receives a second REST request corresponding to the second package type. The second REST request may be to add an artifact, to delete an artifact, to update metadata, etc.

Based on the REST request, REST API 312 initiates a job at index calculation logic 316 and provides a request to repository 320 (e.g., to the API that corresponds to the request). For example, if the REST request indicates adding or deleting an artifact, the request is provided to storage API 322. If the REST request indicates updating metadata, the request is provided to metadata API 324. If the REST request indicates a search, the request is provided to searches API 326. Additionally, REST API 312 initiates a job at index calculation logic 316 and provides a request to repository 320 (e.g., to storage API 414, metadata API 416, or searches API 418).

As index calculation logic 316 generates index indicia based on the jobs, the index indicia are provided to indexer 260 and stored in queue 442. After a threshold number of index indicia have been received, or after a threshold time period since receipt of the first index indicia, the index indicia in queue 442 are processed by index calculation logic 440 to generate one or more index values, which are used (e.g., by execution logic 444) to generate one or more package type indices. Additionally, or alternatively, indexer 260 may process index indicia from queue 442 in another manner, such as on a first in, first out basis. Execution logic 444 generates index object data and causes the index object data to be stored at the memory 330. For example, index object data corresponding to the first package type may be stored at first partition 430 (e.g., in one of entries 332-339), and index object data corresponding to the second package type may be stored at second partition 432 (e.g., in one of entries 434-436).

Thus, FIG. 4 illustrates an example of including multiple package type modules in the index framework described with reference to FIG. 3. By including multiple package type modules, the index framework is able to support multiple different package types, including each package type's internal structures and interdependencies, in a unified and cohesive manner.

Figure 5:
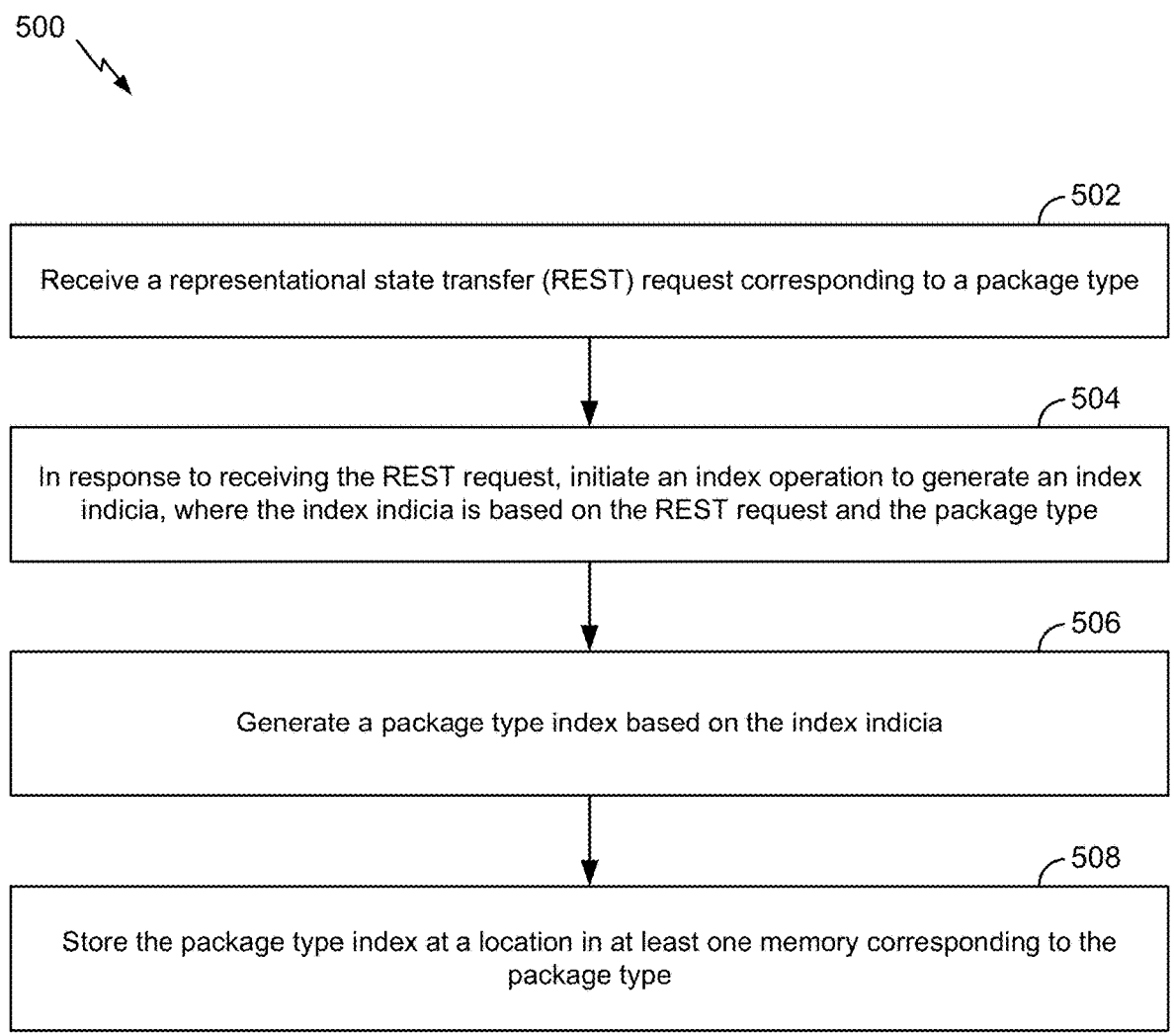
FIG. 5 is a flow diagram of an example of a method for operating a repository that supports multiple package types.

FIG. 5 is a flow diagram of a method 500 of operating a repository supporting multiple package types. Method 500 may be stored in a computer-readable storage medium as instructions that, when executed by one or more processors, cause the one or more processors to perform the operations of method 500. In a particular implementation, method 500 may be performed by server 110 (e.g., one or more processors 250 and/or indexer 260), server 168 (e.g., a processor and/or a module), system 300, and/or system 400.

At 502, method 500 includes receiving a representational state transfer (REST) request corresponding to a package type. For example, REST API 312 may receive REST request 310.

At 504, method 500 includes, in response to receiving the REST request, initiating an index operation to generate an index indicia. The index indicia is based on the package type and a portion of at least one memory corresponding to the package type. For example, REST API 312 may initiate job 318 (e.g., an index operation) to generate index indicia 340.

At 506, method 500 includes generating a package type index based on the index indicia. For example, indexer 260 may generate package type index 342 based on index indicia 340.

At 508, method 500 further includes storing the package type index at a location in the at least one memory corresponding to the package type. For example, indexer 260 may store index object data 344 at memory 330.

In a particular implementation, method 500 includes receiving and storing a first package module corresponding to the first package type of the multiple package types and receiving and storing a second package module corresponding to a second package type of the multiple package types. For example, first package type module 402 may be received and stored, and second package type module 410 may be received and stored. In some such implementations, the first package module includes an abstraction of internal structures and interdependencies of the first package type to maintain consistency for the first package type, and the second package module includes an abstraction of internal structures and interdependencies of the second package type to maintain consistency for the second package type. For example, first package type module 402 includes first model 404, and second package type module 410 includes second model 420.

In a particular implementation, method 500 includes receiving a request via an interface node, identifying a package type associated with the request, generating the REST request based on the identified request, and providing the REST request to a REST application program interface (API) module corresponding to the package type. For example, request 306 may be received via API 308, a package type associated with request 306 may be identified, REST request 310 may be generated, and REST request 310 may be provided to REST API 312 corresponding to the package type.

In a particular implementation, method 500 includes identifying an operation based on the REST request, generating a repository request based on the operation, and providing the repository request to a repository module corresponding to the package type. For example, storage request 314 may be generated and provided to repository 320 based on an operation identified in REST request 310. In some such implementations, the repository module includes a storage API, a metadata API, and a search API, and the repository request includes a storage request for the storage API, a metadata request for the metadata API, or a search request for the search API. For example, storage request 314 may include a storage request for storage API 322, a metadata request for metadata API 324, or a search request for searches API 326.

In a particular implementation, method 500 includes initiating multiple index operations including the index operation and, for each index operation of the multiple index operations: generating a corresponding index indicia and storing the index indicia at a queue. For example, multiple jobs may be initiated by REST API 312, resulting in generation of multiple index indicia 340 that are stored at queue 442. In some such implementations, method 500 may further include receiving an index model for the package type, identifying a set of index indicia of the multiple index indicia, each index indicia of the set of index indicia having the same package type, receiving a first package type index corresponding to the package type, and generating a second package type index based on the set of index indicia stored in the queue, the index model, and the first package type index. For example, indexer 260 may receive first model 404, identify a set of index indicia that each have the same package type, receive package type index 342 corresponding to the package type, and generate a second package type index based on the set of indicia stored in queue 442, first model 404, and package type index 342.

In a particular implementation, the REST request includes a package deploy request or a package delete request for an artifact corresponding to the package type. For example, REST request 310 may include a package deploy request or a package delete request. Additionally, or alternatively, the REST request may include a metadata request for an artifact corresponding to the package type. For example, REST request 310 may include a metadata update request for an artifact corresponding to the package type.

In a particular implementation, method 500 further includes receiving another REST request including a search request corresponding to the package type, performing a search operation based on the search request, and providing a search result based on the search operation. For example, REST API 312 may receive a REST request including a search request, searches API 326 may perform the search, and search results may be provided, as further described with reference to FIGS. 12-15.

Method 500 describes performing an index operation based on a REST request to generate a store a package type index at a location in at least one memory corresponding to a package type of the REST request. Thus, method 500 generates index information in accordance with an index framework that supports multiple package types. By using the index framework, a repository may be configured that maintains internal structures and interdependencies for each of multiple package types supported by the repository. Additionally, or alternatively, additional package types may be added to the index framework to increase the amount of package types supported by the repository.

Referring to FIGS. 6-17, one or more views provided by the system 100, 200, or 300 are shown. One or more of the views may include or correspond to a graphical user interface (GUI) generated by server 110 (e.g., one or more processors 250) or server 168 and presented by a display device, such as a display device of entity 150, 150a, 150b. Additionally, or alternatively, interactions (e.g., input selections) with the views may be initiated by entity 150, 150a, 150b and communicated to server 110, 168 (e.g., one or more processors 250), and operations/functions to present and/or modify the views may be performed by server 110, 168 (e.g., one or more processors 250) and communicated to entity 150, 150a, 150b.

Figure 6:
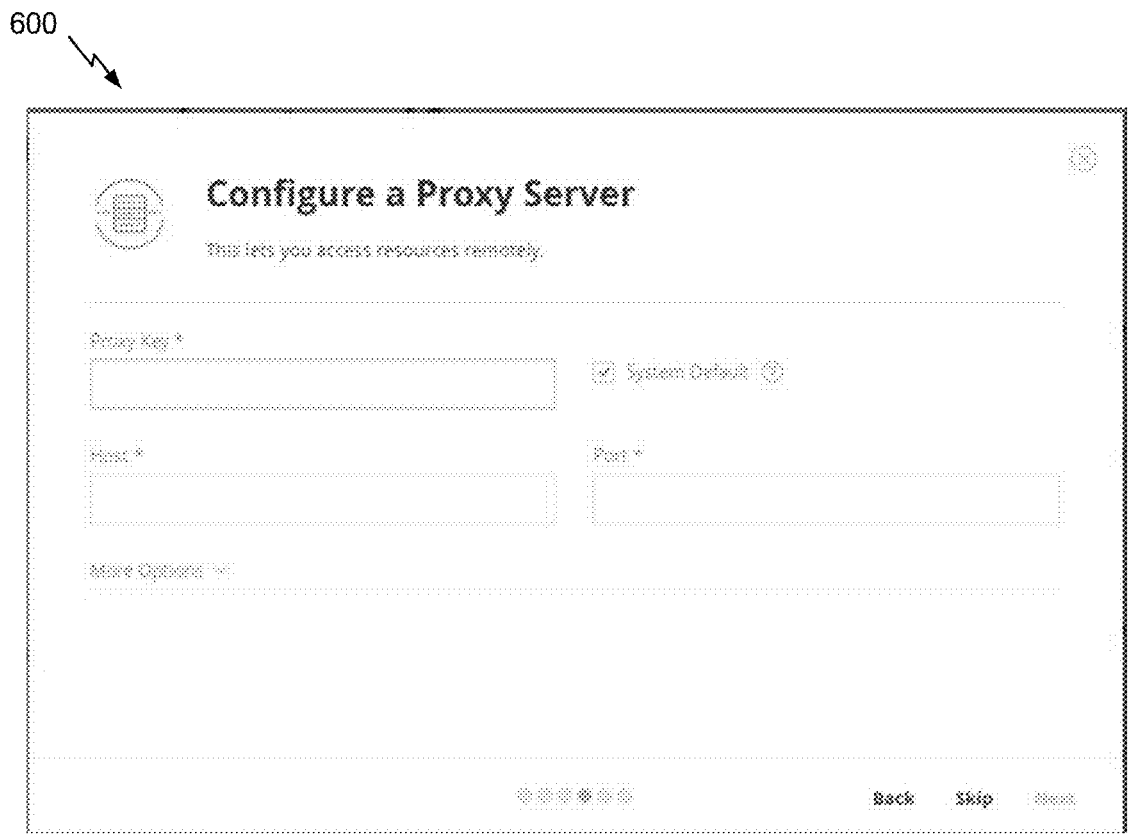
FIG. 6 illustrates an example of a view associated with setting up a repository.

Referring to FIG. 6, a view associated with setting up a repository is shown and designated 600. View 600 may be displayed as part of a setup wizard that is run when initially setting up an artifact repository. View 600 includes user configurable items associated with setting up a proxy server. Setting up a proxy server may enable remote access to the artifact repository. In a particular implementation, as shown in FIG. 6, setting up a proxy server includes specifying a proxy key, a host, and a port. In some implementations, more options may be available by selection of a drop-down menu. Information entered into the user configurable items may be stored by selecting a "Next" button, or the process may be skipped (and no proxy server set up) by selection of a "Skip" button.

Figure 7:
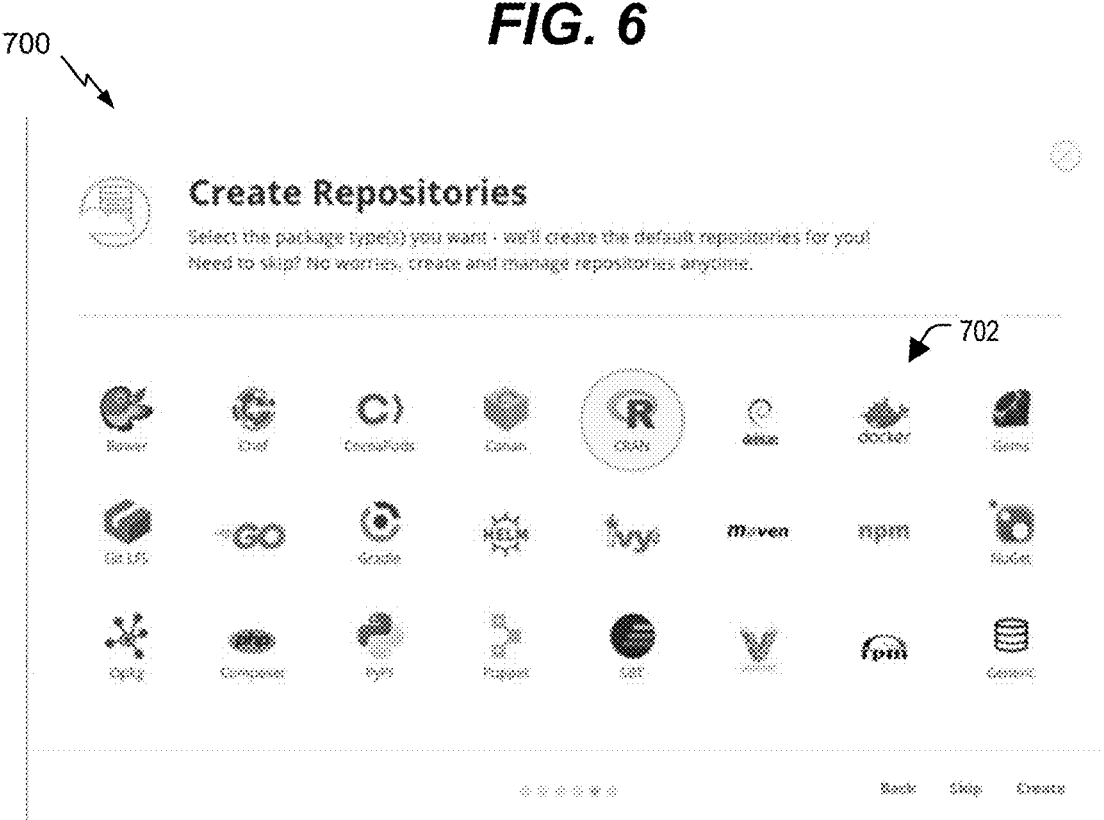
FIG. 7 illustrates an example of a view associated with selecting package types for a repository.

Referring to FIG. 7, a view associated with selecting package types for a repository is shown and designated 700. View 700 may be displayed as part of a setup wizard that is run when initially setting up an artifact repository. View 700 includes a plurality of selectable package type icons 702, each associated with a different package type. Selection of one or more of the plurality of selectable package type icons 702 enables the system to generate default user repositories for the selected package type(s). In a particular implementation, the package types include Bower, Chef, CocoaPods, Conan, Conda, CRAN, Debian, Docker, Git LFS, Go, Gradle, Helm, Ivy, Maven, npm, NuGet, Opkg, P2, PHP Composer, Puppet, PyPI, RPM, RubyGems, SBT, Vagrant, and VCS. Selections of one or more of the plurality of selectable package type icons 702 may be finalized by selecting a "Next" button, or the process may be skipped (and no default repositories set up) by selection of a "Skip" button.

Figure 8:
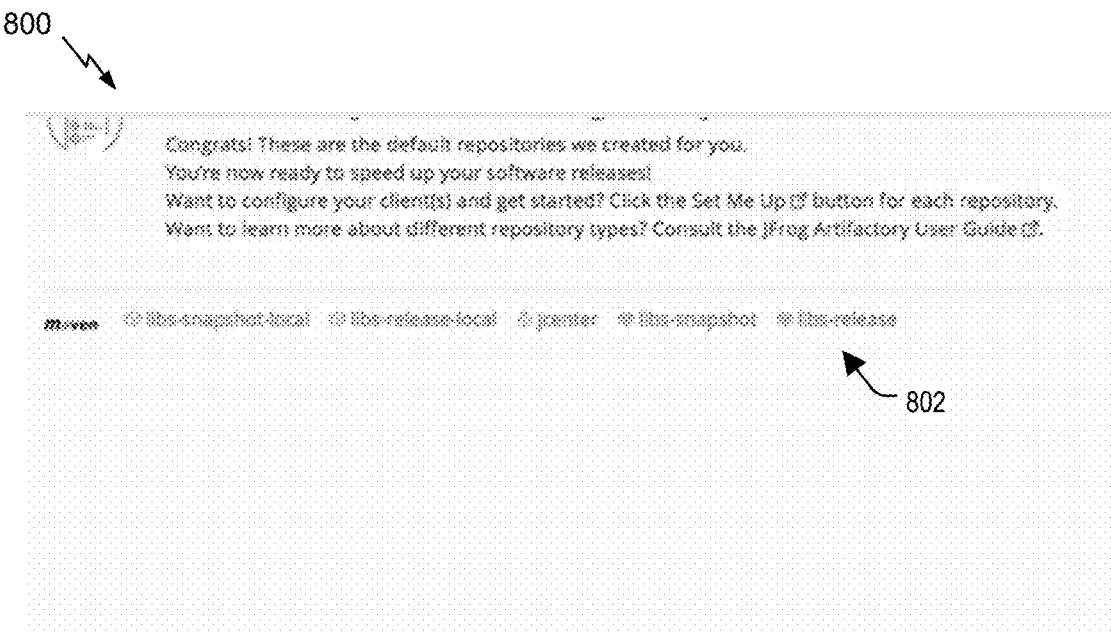
FIG. 8 illustrates an example of a view associated with created repositories.

Referring to FIG. 8, a view associated with created user repositories is shown and designated 800. View 800 illustrates default repositories that are set up by the system in response to selection of one of the plurality of selectable package type icons 702 of FIG. 7. In a particular implementation illustrated in FIG. 8, the Maven package type has been selected, and a plurality of default repositories 802 have been created, including a libs-snapshot-local repository, a libs-release-local repository, a jcenter repository, a libs-snapshot repository, and a libs-release repository. Setting up the default repositories for the selected package type may include generating or associating one or more default repositories with a model corresponding to the selected package type, as further described with reference to FIG. 3.

Figure 9:
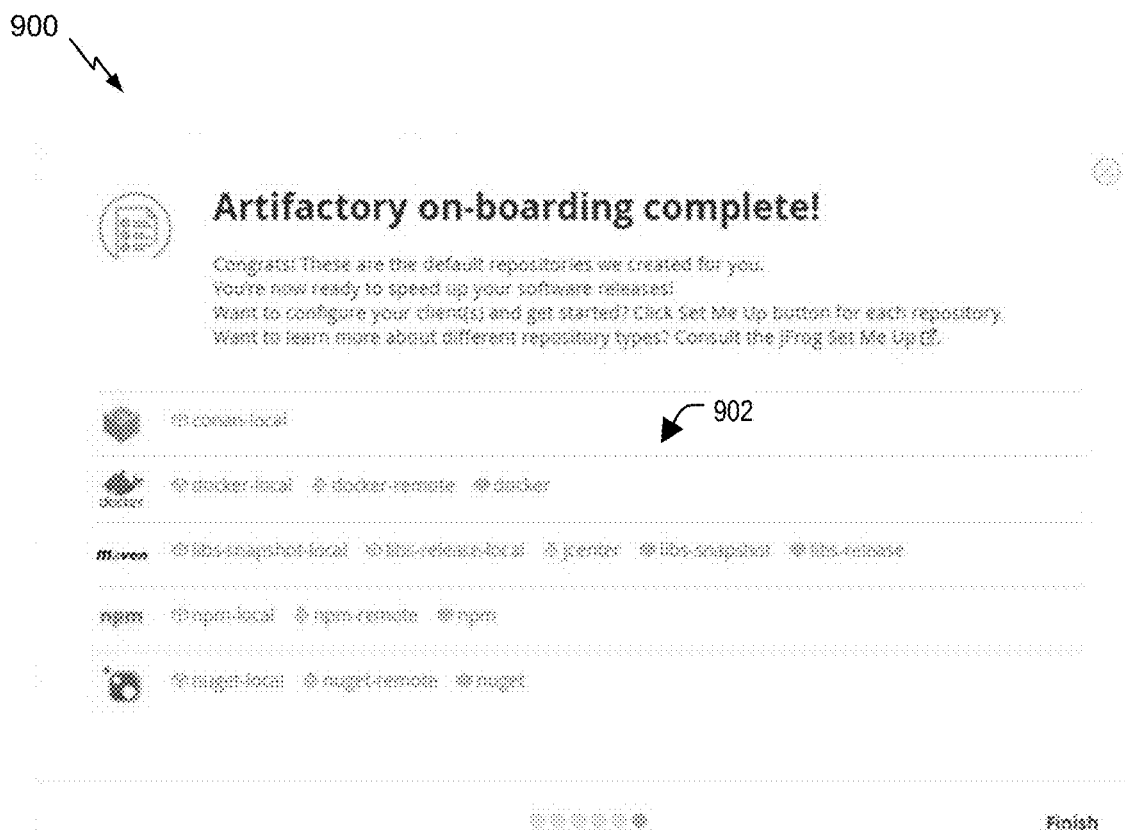
FIG. 9 illustrates another example of a view associated with created repositories.

Referring to FIG. 9, a view associated with created repositories is shown and designated 900. View 900 illustrates default repositories that are set up by the system in response to selection of multiple of the plurality of selectable package type icons 702 of FIG. 7. In a particular implementation illustrated in FIG. 9, Conan, Docker, Maven, npm, and NuGet have been selected, and a plurality of default repositories 902 have been created. Setting up the default repositories for the selected package types may include generating or associating one or more default repositories a model corresponding to each of the selected package types, as further described with reference to FIG. 3.

Figures 10, 11:
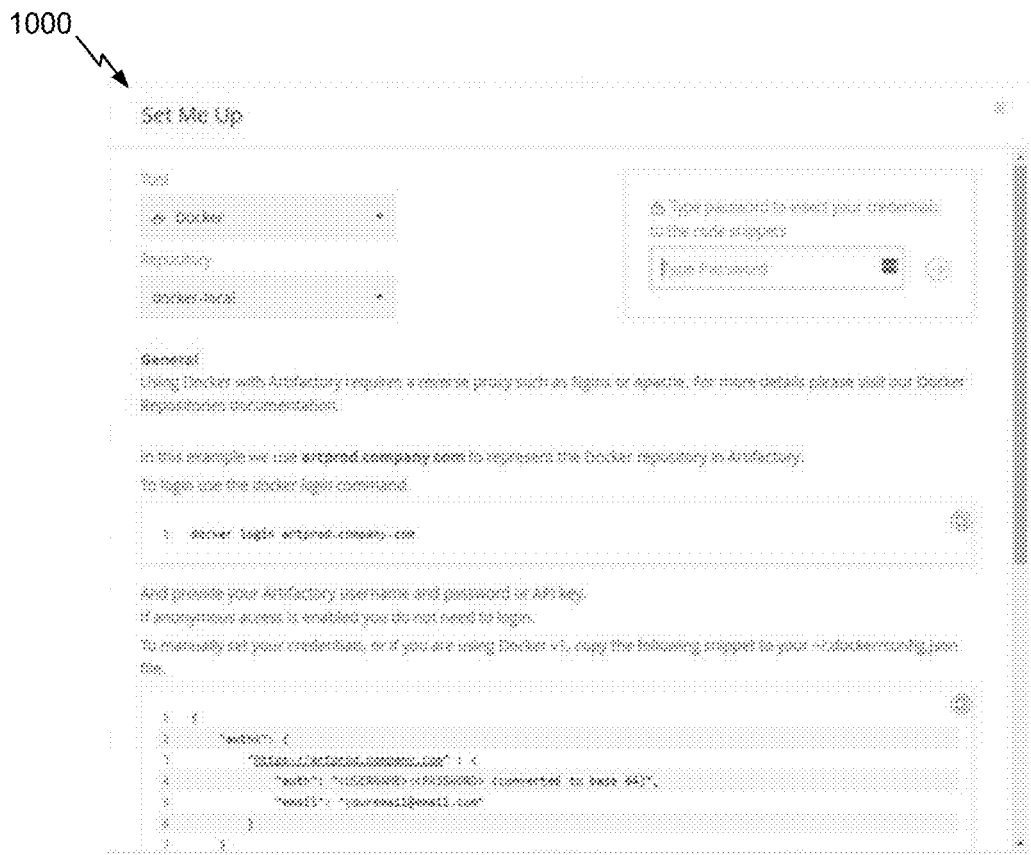
FIG. 10 illustrates an example of a view associated with setting up a repository.
FIG. 11 illustrates an example of a view associated with browsing a repository.

Referring to FIG. 10, a view associated with setting up a repository is shown and designated 1000. View 1000 illustrates setup options for a selected repository. The options may include the tool associated with the repository, the repository name, and a password (or credentials) associated with the repository. View 1000 also illustrates code to be added to a corresponding config file (associated with the package type of the repository) to enable files of the package type to be added to the repository. Setting up the repository in this manner deploys and resolves artifacts (and the corresponding interdependencies) into the repository.

Referring to FIG. 11, a view associated with browsing a repository is shown and designated 1100. View 1100 illustrates a browsing window for artifacts within one or more repositories. The one or more repositories include one or more artifacts 1102, which in one view are organized based on repository. In a tree browsing mode (shown in FIG. 11), a user is able to drill down through the repository hierarchy and display full information for each level within. For any repository, folder, or artifact selected in the tree, a tabbed panel displays detailed data views and a variety of actions that can be performed on the selected item. The information tabs may be context sensitive and depend on the item selected. For example, if an npm package is selected, an npm info tab displays information specific to npm packages. In other implementations, instead of tree browsing mode, simple browsing mode may be used, which enables browsing of repositories using path-driven URLs. Additionally, or alternatively, filters may be applied (in either browsing mode) to filter results, such as by repository name, by package type, or by repository type, as non-limiting examples.

Figures 12, 13:
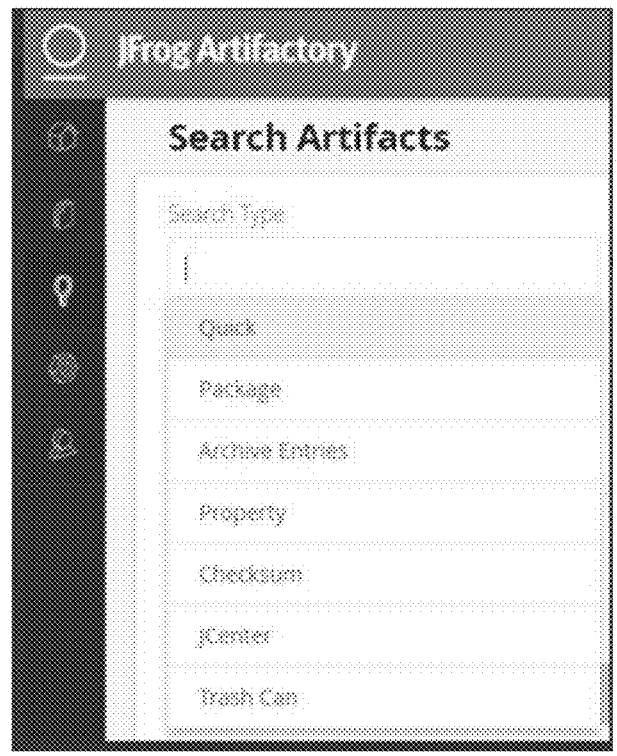
FIG. 12 illustrates an example of a view associated with searching a repository.
FIG. 13 illustrates an example of a view associated with search results from searching a repository.

Referring to FIG. 12, a view associated with searching a repository is shown and designated 1200. View 1200 includes a drop-down menu of different searches that can be performed for artifacts in one or more repositories. For example, a quick search can be performed to search for an artifact by name. As another example, a package search can be performed to search for artifacts according to criteria specific to the package type. As another example, an archive entries search can be performed to search for artifacts in an archive (e.g., a zip or jar file, as non-limiting examples). As another example, a property search can be performed to search for artifacts based on names and values of properties assigned to the artifacts. As another example, a checksum search can be performed based on an artifact's checksum value.

The searches may be performed by an indexer, or based on information, such as metadata, generated by an indexer (e.g., indexer 260 of FIGS. 2 and 3). For example, indexer 260 may generate metadata beyond the package-type specific metadata to enable searching functionality. This may include searches such as the property search or the checksum search, as non-limiting examples.

Referring to FIG. 13, a view associated with search results from searching a repository is shown and designated 1300. View 1300 shows results of a quick search. In a particular implementation, the results may include an artifact name, a path, a repository where the artifact is stored, and a modification date/time for the artifact. In other implementations, other information may be displayed.

Figure 14:
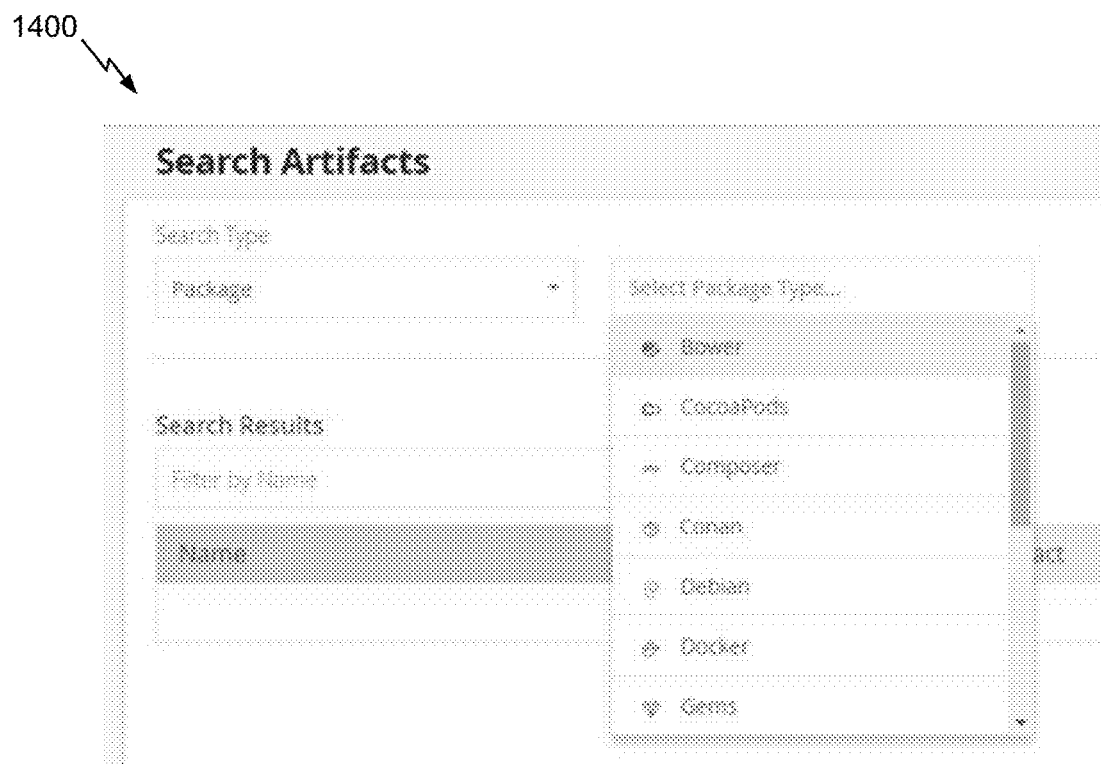
FIG. 14 illustrates an example of a view associated with searching a repository by package type.

Referring to FIG. 14, a view associated with searching a repository by package type is shown and designated 1400. View 1400 shows a package search (e.g., a search by package type). As shown in FIG. 14, a drop-down menu of package types may be used to select a particular package type to search for. Once the package type is selected, criteria corresponding to the selected package type are displayed as searchable parameters. For example, for Docker files, a search can be performed by full image namespace, image tag, or image digest. For Conan files, a search can be performed by package name, version, user, channel, OS, architecture, build type, or compiler. For NuGet files, a search can be performed by packaged ID or version. Other parameters correspond to other package types. Thus, the package search enables a search by package-specific criteria.

Figure 15:
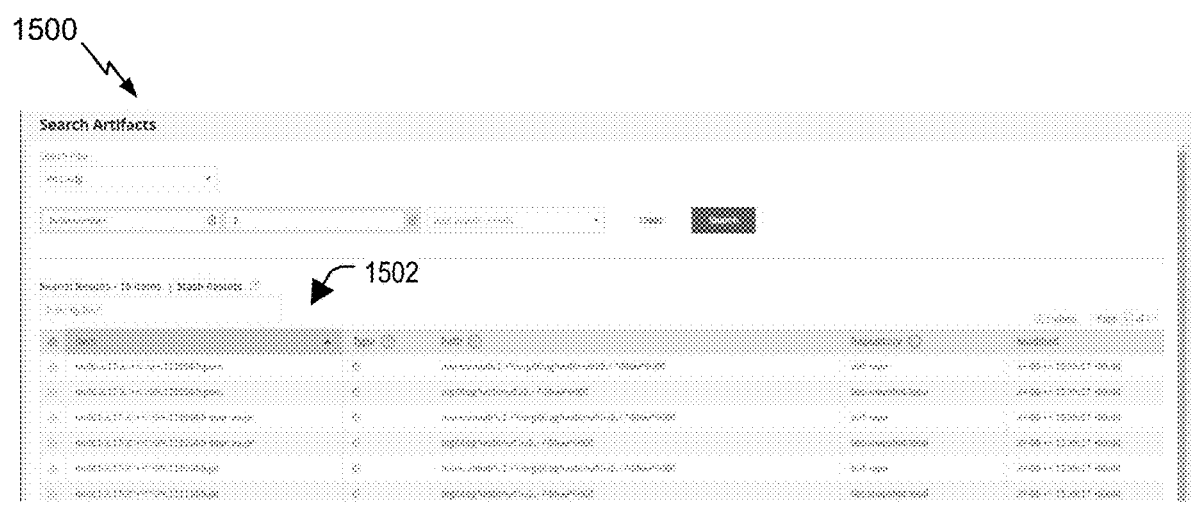
FIG. 15 illustrates an example of a view associated with searching a repository by build.

Referring to FIG. 15, a view associated with searching a repository by build is shown and designated 1500. View 1500 shows a property search. A property search can be performed based on properties that are system-defined, user-defined, or both. In the illustrated implementation, build number has been selected as the property to be searched. Additional search criteria can be added through use of an add search criteria box. View 1500 also shows a plurality of search results 1502. In a particular implementation, the results may include an artifact name, a path, a repository where the artifact is stored, and a modification date/time for the artifact. In other implementations, other information may be displayed.

Figure 16:
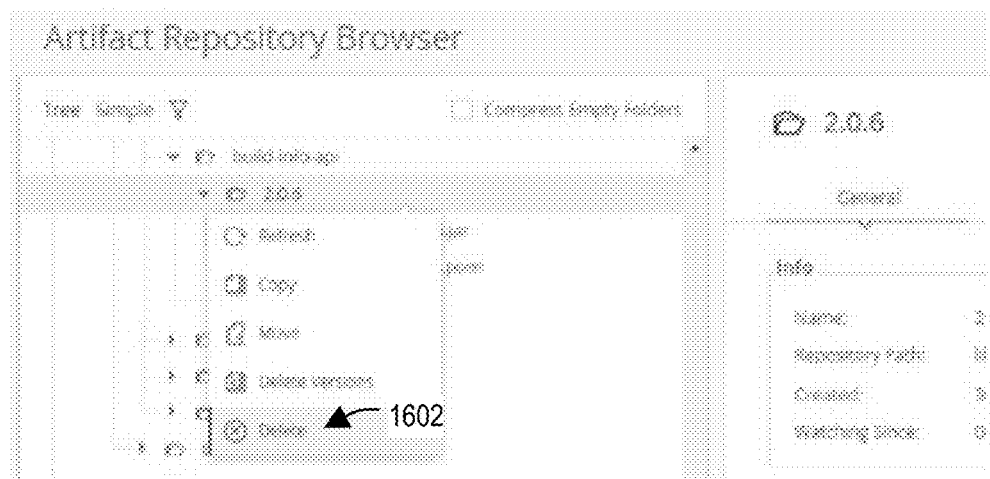
FIG. 16 illustrates an example of a view associated with deleting an artifact from a repository.

Referring to FIG. 16, a view associated with deleting an artifact from a repository is shown and designated 1600. View 1600 shows a delete option 1602. The delete option causes an artifact to be deleted from the corresponding repository. When the artifact is deleted, the corresponding metadata file is updated to reflect the change so that the deleted artifact is not found in a search.

Figure 17:
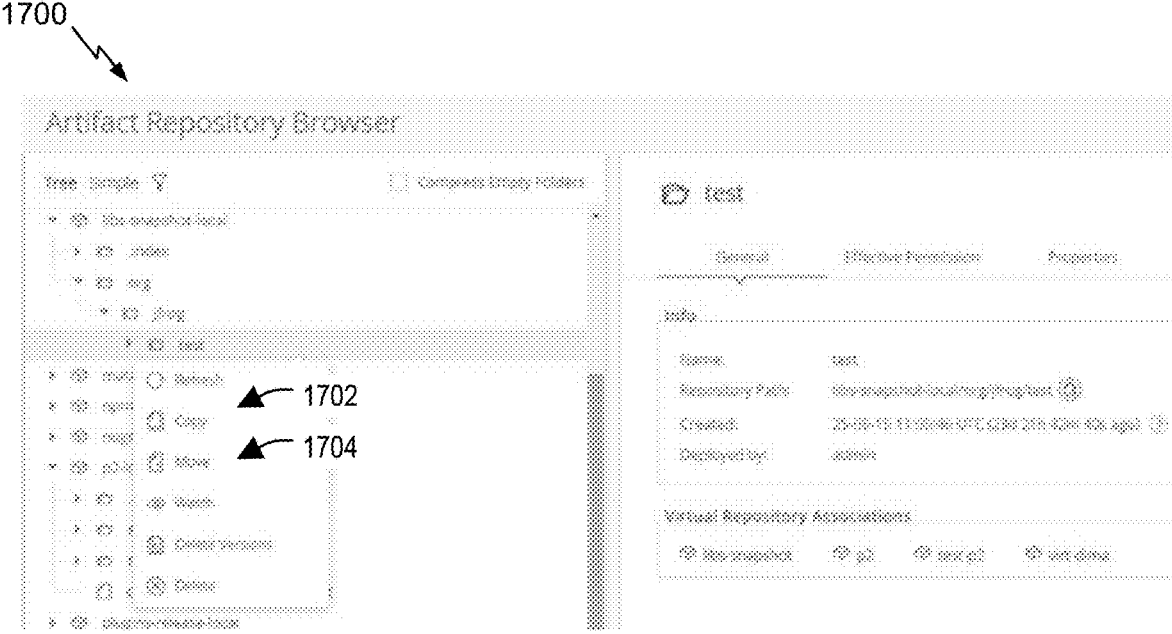
FIG. 17 illustrates an example of a view associated with copying or moving an artifact in a repository.

Referring to FIG. 17, a view associated with copying or moving an artifact in a repository is shown and designated 1700. View 1700 shows a copy option 1702 and a move option 1704. Copy option 1702 enables an artifact to be copied to a target repository (with the original artifact remaining in the initial repository). Move option 1704 enables an artifact to be moved from an initial repository to a target repository. In a particular implementation, choices of the target repository are limited to repositories of the same package type or generic repositories. Artifacts may be copied or moved to a target path within the target directory if selected. Once the artifact is copied or moved, the metadata is updated to reflect the change.

In some aspects, techniques for supporting a repository supporting multiple package types may include additional aspects, such as any single aspect or any combination of aspects described below or in connection with one or more other processes or devices described elsewhere herein. In some aspects, supporting a repository supporting multiple package types may include a system configured to receive a REST request corresponding to a package type. The system is further configured to, in response to receipt of the REST request, initiate an index operation to generate an index indicia. The index indicia is based on the package type and content of a portion of the at least one memory corresponding to the package type. The system is also configured to generate a package type index based on the index indicia, and store the package type index at a location in the at least one memory corresponding to the package type. In some implementations, the system includes one or more devices, one or more processors, one or more package modules, or a combination thereof. For example, one or more operations described with reference to the system may be performed by the one or more devices, the one or more processors, the one or more package modules, or the combination thereof. In some implementations, the system may include at least one processor, and a memory coupled to the processor. The processor may be configured to perform operations described herein with respect to the system. In some other implementations, the system may include a non-transitory computer-readable medium having program code recorded thereon and the program code may be executable by a computer for causing the computer to perform operations described herein with reference to the system. In some implementations, the system may include one or more means configured to perform operations described herein. In some implementations, a method of a repository supporting multiple package types may include one or more operations described herein with reference to the system.

In a first aspect, the system is further configured to receive and store a first package module corresponding to a first package type of the multiple package types.

In a second aspect, in combination with the first aspect, the first package module includes an abstraction of internal structures and interdependencies of the first package type to maintain consistency for the first package type.

In a third aspect, alone or in combination with one or more of the first through second aspects, the system is further configured to receive and store a second package module corresponding to a second package type of the multiple package types.

In a fourth aspect, in combination with the third aspect, the second package module includes an abstraction of internal structures and interdependencies of the second package type to maintain consistency for the second package type.

In a fifth aspect, alone or in combination with one or more of the first through fourth aspects, the system is further configured to receive a request via an interface node.

In a sixth aspect, in combination with the fifth aspect, the system is further configured to identify a package type associated with the request.

In a seventh aspect, in combination with the sixth aspect, the system is further configured to generate the REST request based on the identified request.

In an eighth aspect, in combination with the seventh aspect, the system is further configured to provide the REST request to a REST API module corresponding to the package type.

In a ninth aspect, alone or in combination with one or more of the first through eighth aspects, the system is further configured to identify an operation based on the REST request.

In a tenth aspect, in combination with the ninth aspects, the system is further configured to generate a repository request based on the operation.

In an eleventh aspect, in combination with the tenth aspect, the system is further configured to provide the repository request to a repository module corresponding to the package type.

In a twelfth aspect, in combination with the ninth through eleventh aspects, the repository module includes a storage API, a metadata API, and a search API.

In a thirteenth aspect, in combination with the twelfth aspect, the repository request includes a storage request for the storage API, a metadata request for the metadata API, or a search request for the search API.

In a fourteenth aspect, alone or in combination with one or more of the first through thirteenth aspects, the system is further configured to initiate multiple index operations including the index operation.

In a fifteenth aspect, in combination with the fourteenth aspect, the system is further configured to, for each index operation of the multiple index operations, generate a corresponding index indicia.

In a sixteenth aspect, in combination with the fifteenth aspect, the system is further configured to store the index indicia at a queue.

In a seventeenth aspect, in combination with the sixteenth aspect, the system is further configured to receive an index model for the package type.

In an eighteenth aspect, in combination with the seventeenth aspect, the system is further configured to identify a set of index indicia of the multiple index indicia. In some implementations, each index indicia of the set of index indicia has the same package type.

In a nineteenth aspect, in combination with the eighteenth aspect, the system is further configured to receive a first package type index corresponding to the package type.

In a twentieth aspect, in combination with the nineteenth aspect, the system is further configured to generate a second package type index based on the set of index indicia stored in the queue, the index model, and the first package type index.

In a twenty-first aspect, alone or in combination with one or more of the first through twentieth aspects, the REST request includes a package deploy request or a package delete request for an artifact corresponding to the package type.

In a twenty-second aspect, alone or in combination with one or more of the first through twenty-first aspects, the REST request includes a metadata request for an artifact corresponding to the package type.

In a twenty-third aspect, alone or in combination with one or more of the first through twenty-second aspects, the system is further configured to receive another REST request including a search request corresponding to the package type.

In a twenty-fourth aspect, alone or in combination with one or more of the first through twenty-third aspects, the system is further configured to performing a search operation based on the search request; and In a twenty-fifth aspect, alone or in combination with one or more of the first through twenty-fourth aspects, the system is further configured to provide a search result based on the search operation.

In a twenty-sixth aspect, alone or in combination with one or more of the first through twenty-fifth aspects, the system includes the at least one memory storing a representation of one or more package modules. In some implementations, the one or more package modules includes a representational state transfer REST API module, an index model module, and a repository module.

In a twenty-seventh aspect, alone or in combination with one or more of the first through twenty-sixth aspects, each of the one or more package modules corresponds to a package type and is configured to provide an abstraction of internal structures and interdependencies of the package type.

In a twenty-eighth aspect, alone or in combination with one or more of the first through twenty-seventh aspects, the system includes an API node configured to receive a request corresponding to a package type, identify a package type corresponding to the request, and send the REST request corresponding to the request to the REST API module.

In a twenty-ninth aspect, in combination with the twenty-eighth aspect, the API node corresponds to the package type.

In a thirtieth aspect, alone or in combination with one or more of the twenty-sixth through twenty-ninth aspects, the system is further configured to, based on the REST request, initiate the repository module to perform an operation on the portion of the at least one memory corresponding to the package type.

In a thirty-first aspect, in combination with the thirtieth aspect, the REST API module is configured to initiate the repository module to perform the operation.

In a thirty-second aspect, in combination with the twenty-sixth aspect, the repository module includes a storage module, a metadata module, a search module, or any combination thereof.

In a thirty-third aspect, in combination with the thirty-second aspect, the storage module includes a first API.

In a thirty-fourth aspect, in combination with the thirty-second through thirty-fourth aspects, the metadata module includes a second API.

In a thirty-fifth aspect, alone or in combination with one or more of the thirty-second through thirty-third aspects, the search module includes a third API.

In a thirty-sixth aspect, in combination with the twenty-sixth aspect, the index model module is configured to generate an instance of index calculation logic to generate the index indicia based on the index operation and to maintain the index indicia in a queue.

In a thirty-seventh aspect, in combination with the thirty-sixth aspect, the package type index includes an index object, metadata, a metadata update, or a combination thereof.

In a thirty-eighth aspect, alone or in combination with one or more of the first through thirty-seventh aspects, the system is further configured to an index model database configured to store one or more index models. In some implementations, each of the one or more index models includes an index model for a corresponding package type.

In a thirty-ninth aspect, in combination with the thirty-eighth aspect, the system is further configured to generate the package type index and to receive the index indicia.

In a fortieth aspect, in combination with the thirty-ninth aspect, the system is further configured to receive, from the index model database, the index model for the package type. In some implementations, the index model for the package type includes a set of rules for maintaining consistency of a portion of the at least one memory corresponding to the package type.

In a forty-first aspect, in combination with the fortieth aspect, the system is further configured to receive the index indicia and the index model at the index model module.

In a forty-second aspect, in combination with one or more of the thirty-ninth through forty-first aspects, the reflection data corresponds to an index object stored at the at least one memory.

In a forty-third aspect, alone or in combination with one or more of the first through forty-second aspects, the package type includes a package type selected from the group consisting of Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS.

In a forty-fourth aspect, alone or in combination with one or more of the first through forty-third aspects, the REST request includes a REST application program interface (API) request.

In a forty-fifth aspect, alone or in combination with one or more of the first through forty-fourth aspects, the package type index is stored at the at least one memory to maintain consistency of the portion of the at least one memory corresponding to the package type.

Although one or more of the disclosed figures may illustrate systems, apparatuses, methods, or a combination thereof, according to the teachings of the disclosure, the disclosure is not limited to these illustrated systems, apparatuses, methods, or a combination thereof. One or more functions or components of any of the disclosed figures as illustrated or described herein may be combined with one or more other portions of another function or component of the disclosed figures. Accordingly, no single implementation described herein should be construed as limiting and implementations of the disclosure may be suitably combined without departing from the teachings of the disclosure.

The steps of a method or algorithm described in connection with the implementations disclosed herein may be included directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD- ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

Although the present disclosure and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A system for operating a repository supporting multiple package types, the system comprising:
at least one memory storing representations of multiple package modules, each of the multiple package modules corresponding to a different package type of the multiple package types and comprising a respective index model module; and
one or more processors coupled to the at least one memory, the one or more processors configured to:
initiate an index operation to generate an index indicia responsive to receipt of a request corresponding to a package type of the multiple package types, where the index indicia is based on the package type and content of a portion of the at least one memory corresponding to the package type;
generate, at an index model module that corresponds to the package type, a package type index based on the index indicia and an index model corresponding to the package type; and
store the package type index at a location in the at least one memory corresponding to the package type.

2. The system of claim 1, further comprising:
an index model database configured to store multiple index models, each of the multiple index models corresponding to one of the multiple package types and comprising a set of rules for maintaining consistency of a portion of the at least one memory corresponding to the one of the multiple package types.

3. The system of claim 2, where, to generate the package type index, the one or more processors are configured to:
receive, at the index model module, the index indicia; and
receive, at the index model module from the index model database, the index model corresponding to the package type.

4. The system of claim 1, where the index model module is configured to generate an instance of index calculation logic to generate the index indicia based on the index operation and to maintain the index indicia in a queue.

5. The system of claim 1, where the package type index comprises an index object, metadata, a metadata update, or a combination thereof.

6. The system of claim 1, where each of the multiple package modules corresponds to a respective package type and is configured to provide an abstraction of internal structures and interdependencies of the respective package type, and where the package type index is stored at the at least one memory to maintain consistency of the portion of the at least one memory corresponding to the package type.

7. The system of claim 1, where each of the multiple package modules further comprise a respective representational state transfer (REST) application program interface (API) module and a respective repository module.

8. The system of claim 7, where a REST API module corresponding to the package type is configured to receive a REST request corresponding to the package type and to perform the index operation, the REST request based on the request.

9. The system of claim 8, further comprising:
an application programming interface (API) node configured to:
receive the request;
identify the package type corresponding to the request; and
generate and send the REST request to the REST API module corresponding to the package type.

10. The system of claim 8, where the one or more processors are further configured to:
based on the REST request, at the REST API module, initiate a repository module corresponding to the package type to perform an operation on the portion of the at least one memory corresponding to the package type.

11. The system of claim 7, where a repository module corresponding to the package type comprises a storage module, a metadata module, a search module, or any combination thereof.

12. A method for operating a repository supporting multiple package types, the method comprising:
initiating, by one or more processors, an index operation to generate an index indicia responsive to receipt of a request corresponding to a package type of the multiple package types, where the index indicia is based on the package type and content of a portion of at least one memory corresponding to the package type;
generating, by the one or more processors, a package type index based on the index indicia and an index model corresponding to the package type; and
storing, by the one or more processors, the package type index at a location in the at least one memory corresponding to the package type.

13. The method of claim 12, further comprising:
receiving and storing, by the one or more processors, a first package module corresponding to a first package type of the multiple package types, the first package module comprising an abstraction of internal structures and interdependencies of the first package type to maintain consistency for the first package type; and
receiving and storing, by the one or more processors, a second package module corresponding to a second package type of the multiple package types, the second package module comprising an abstraction of internal structures and interdependencies of the second package type to maintain consistency for the second package type.

14. The method of claim 12, further comprising:
receiving the request via an interface node;
identifying the package type associated with the request;
generating a respective representational state transfer (REST) request based on the request, the REST request comprising a package deploy request, a package delete request, or a metadata request for an artifact corresponding to the package type; and
providing the REST request to a REST application program interface (API) module corresponding to the package type.

15. The method of claim 14, further comprising:
receiving another REST request comprising a search request corresponding to the package type;
performing a search operation based on the search request; and
providing a search result based on the search operation.

16. The method of claim 12, further comprising:
identifying an operation based on the request;
generating a repository request based on the operation; and
providing the repository request to a repository module corresponding to the package type.

17. The method of claim 12, further comprising:
initiating, by the one or more processors, multiple index operations including the index operation; and
for each index operation of the multiple index operations:
generating a corresponding index indicia; and
storing the index indicia at a queue.

18. The method of claim 17, further comprising:
receiving the index model corresponding to the package type;
identifying a set of index indicia of the index indicia stored at the queue, each index indicia of the set of index indicia having the same package type;
receiving a first package type index corresponding to the package type; and
generating a second package type index based on the set of index indicia stored in the queue, the index model, and the first package type index.

19. A non-transitory computer-readable storage medium storing instructions that, when executed by one or more processors, cause the one or more processors to perform operations for operating a repository supporting multiple package types, the operations comprising:
executing a first routine to, in response to receipt of a request corresponding to a package type of the multiple package types, initiate an index operation to generate an index indicia, where the index indicia is based on the package type and content of a portion of at least one memory corresponding to the package type;
executing a second routine to generate a package type index based on the index indicia and an index model corresponding to the package type; and
executing a third routine to store the package type index at a location in the at least one memory corresponding to the package type.

20. The non-transitory computer-readable storage medium of claim 19, where the package type comprises a package type selected from the group consisting of Bower, Chef, CocoaPods, Conan, Conda, CRAN, Debian, Docker, Git LFS, Go, Helm, Maven, npm, NuGet, Opkg, P2, PHP Composer, Puppet, PyPI, RPM, RubyGems, SBT, Vagrant, and VCS.

* * * * *